US012689846B2

(12) United States Patent
　　　Kobayashi

(10) Patent No.:　US 12,689,846 B2
(45) **Date of Patent:　*Jul. 21, 2026**

(54) PHOTOELECTRIC CONVERSION DEVICE, ELECTRONIC DEVICE, AND SUBSTRATE

(71) Applicant: CANON KABUSHIKI KAISHA, Tokyo (JP)

(72) Inventor: Hideo Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 18/820,408

(22) Filed: Aug. 30, 2024

(65) Prior Publication Data

US 2024/0422451 A1　Dec. 19, 2024

Related U.S. Application Data

(63) Continuation of application No. 17/690,255, filed on Mar. 9, 2022, now Pat. No. 12,108,178.

(30) Foreign Application Priority Data

Mar. 18, 2021　(JP) ................................. 2021-045160

(51) Int. Cl.
　　H04N 25/79　　　(2023.01)
　　H04N 25/766　　(2023.01)
　　H04N 25/78　　　(2023.01)
(52) U.S. Cl.
　　CPC ........... H04N 25/79 (2023.01); H04N 25/766 (2023.01); H04N 25/78 (2023.01)
(58) Field of Classification Search
　　None
　　See application file for complete search history.

(56) References Cited

U.S. PATENT DOCUMENTS

| | | | |
|---|---|---|---|
| 7,990,440 B2 | 8/2011 | Kobayashi et al. | |
| 8,068,152 B2 * | 11/2011 | Blanquart ........... | H04N 25/633 |
| | | | 348/241 |
| 8,233,067 B2 | 7/2012 | Kondo | |
| 8,835,828 B2 | 9/2014 | Kobayashi | |
| 9,509,931 B2 | 11/2016 | Kobayashi et al. | |

(Continued)

FOREIGN PATENT DOCUMENTS

| | | |
|---|---|---|
| JP | 2005-347931 A | 12/2005 |
| JP | 2006-148509 A | 6/2006 |

(Continued)

OTHER PUBLICATIONS

Office Action dated Feb. 14, 2025, in Japanese Patent Application No. 2021-045160.

*Primary Examiner* — Mark T Monk
(74) *Attorney, Agent, or Firm* — Venable LLP

(57) ABSTRACT

A photoelectric conversion device comprising a pixel array that includes pixels each generates a signal via photoelectric conversion arranged in rows and columns, is disclosed. The device also comprises a plurality of determination circuits that perform determination of an amplitude of signals read out from the pixel array via different vertical signal lines. The device further comprises a shared signal line shared by the plurality of determination circuits that transmits results of the determination from the plurality of determination circuits to a circuit inside the photoelectric conversion device.

18 Claims, 12 Drawing Sheets

(56)          References Cited

U.S. PATENT DOCUMENTS

| | | | |
|---|---|---|---|
| 10,284,796 B2 | 5/2019 | Ise | |
| 10,291,869 B2 | 5/2019 | Kobayashi et al. | |
| 11,115,608 B2 | 9/2021 | Sakai et al. | |
| 11,268,851 B2 | 3/2022 | Kobayashi et al. | |
| 11,368,644 B2 | 6/2022 | Etou et al. | |
| 11,405,570 B2 | 8/2022 | Totsuka | |
| 12,108,178 B2 * | 10/2024 | Kobayashi | H04N 25/766 |
| 2015/0229832 A1 * | 8/2015 | Itano | H04N 25/445 |
| | | | 348/295 |
| 2016/0227141 A1 | 8/2016 | Kobayashi et al. | |
| 2017/0359497 A1 * | 12/2017 | Mandelli | H04N 25/77 |
| 2018/0184018 A1 * | 6/2018 | Itano | H04N 23/76 |
| 2019/0104262 A1 * | 4/2019 | Kobayashi | H04N 25/779 |
| 2021/0021770 A1 | 1/2021 | Nakazawa et al. | |
| 2021/0021777 A1 | 1/2021 | Kobayashi et al. | |
| 2021/0021782 A1 | 1/2021 | Sato et al. | |
| 2021/0391365 A1 | 12/2021 | Kobayashi et al. | |
| 2022/0247964 A1 | 8/2022 | Kobayashi | |
| 2022/0302199 A1 | 9/2022 | Kobayashi | |
| 2022/0303484 A1 | 9/2022 | Kobayashi | |
| 2022/0303485 A1 | 9/2022 | Kobayashi | |

FOREIGN PATENT DOCUMENTS

| | | | |
|---|---|---|---|
| JP | 2010-161484 A | 7/2010 | |
| JP | 2012-080252 A | 4/2012 | |
| JP | 2017-200140 A | 11/2017 | |
| JP | 2018-160778 A | 10/2018 | |
| JP | 2019-092143 A | 6/2019 | |
| JP | 2019-153821 A | 9/2019 | |
| JP | 2020-167544 A | 10/2020 | |
| JP | 2020-202480 A | 12/2020 | |
| WO | 2019/069614 A1 | 4/2019 | |

* cited by examiner

F I G. 1
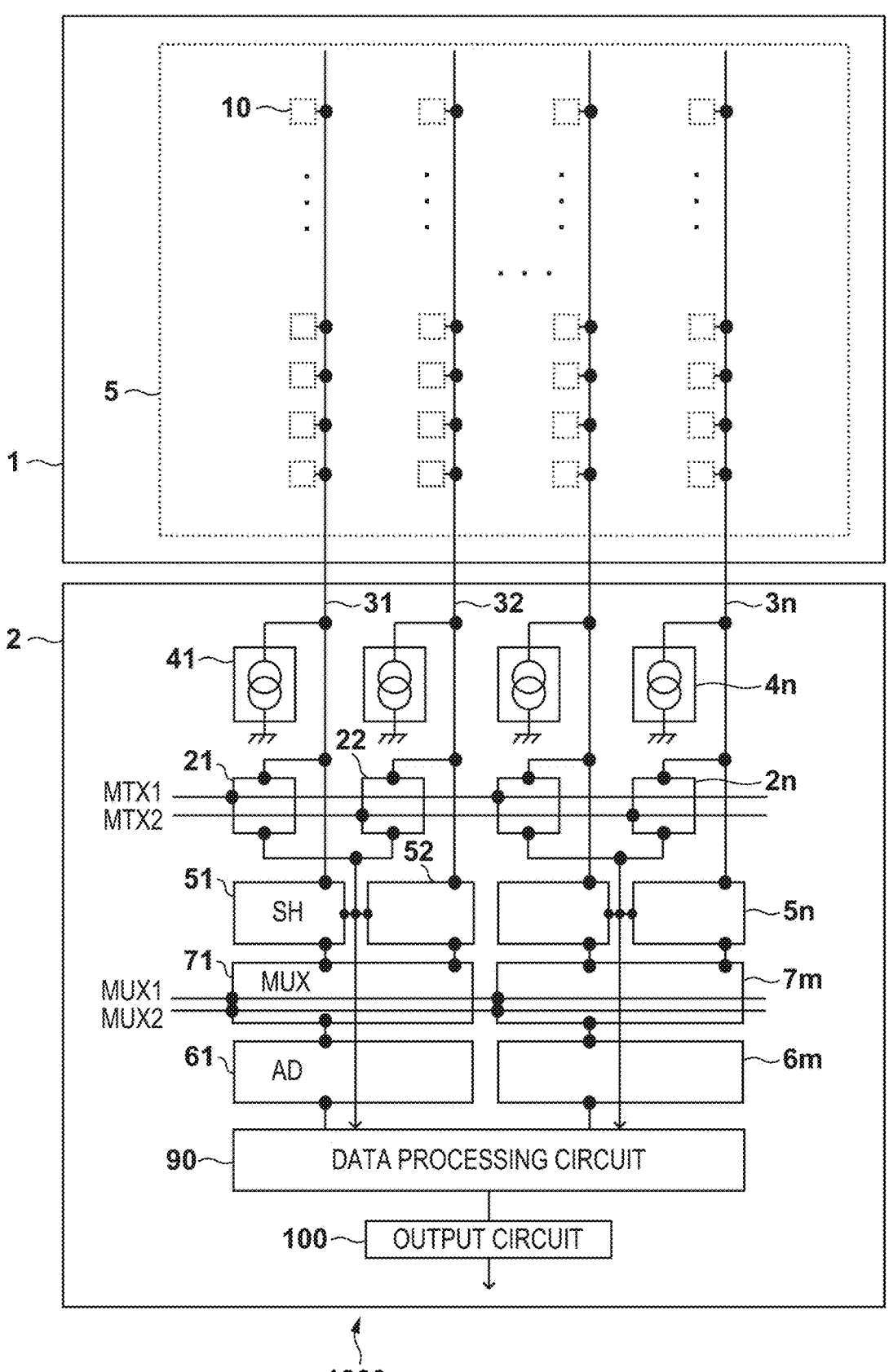

F I G. 2

F I G.  3
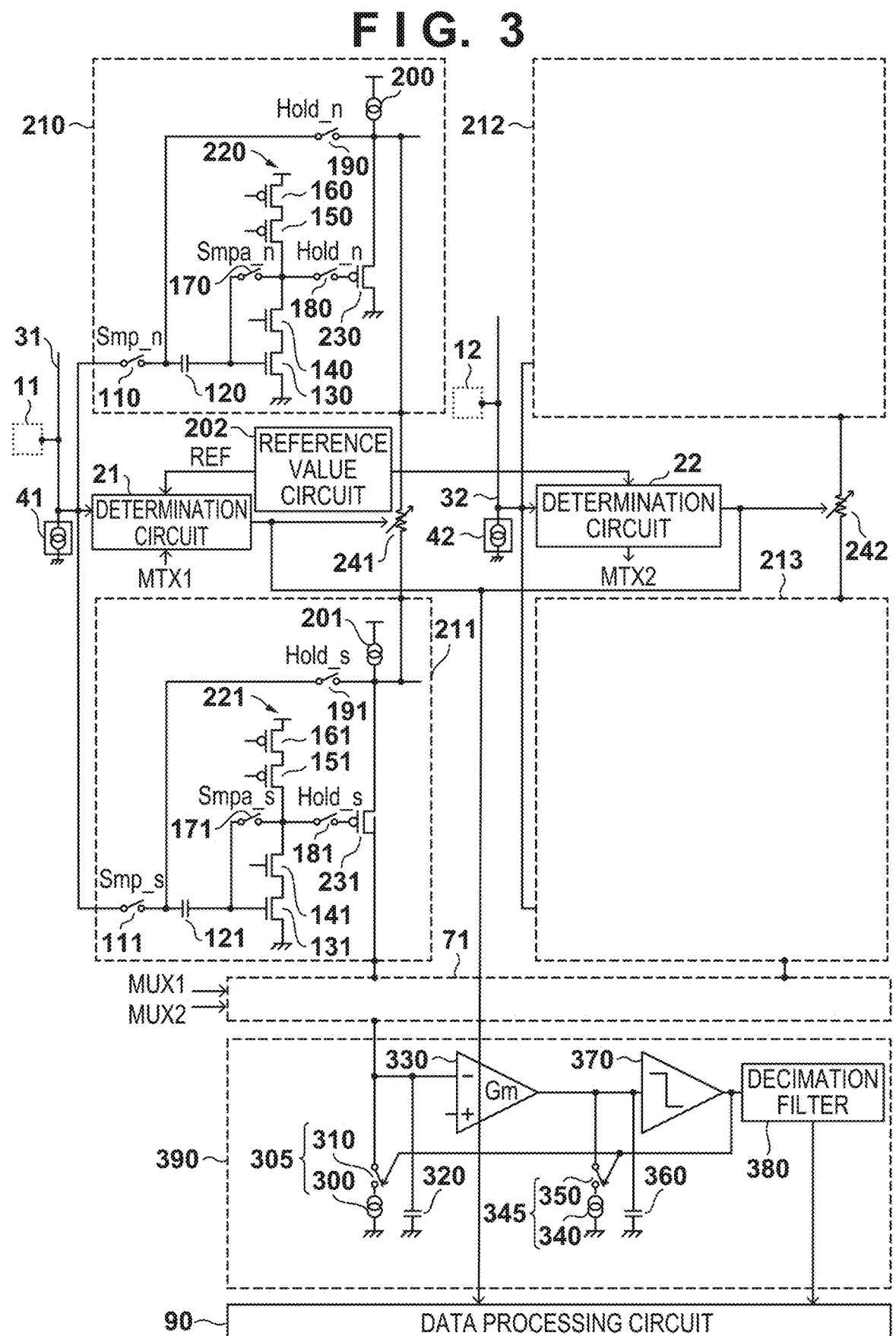

F I G. 6A
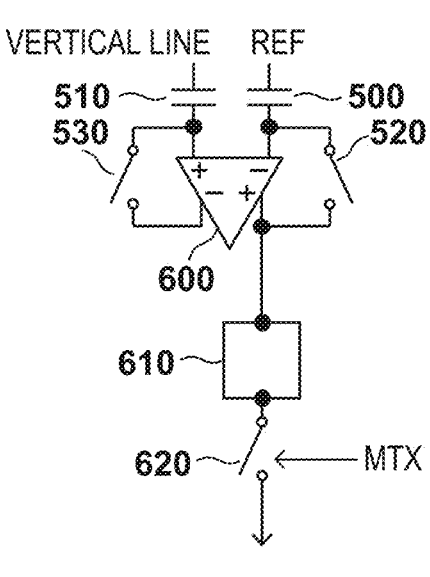
F I G. 6B
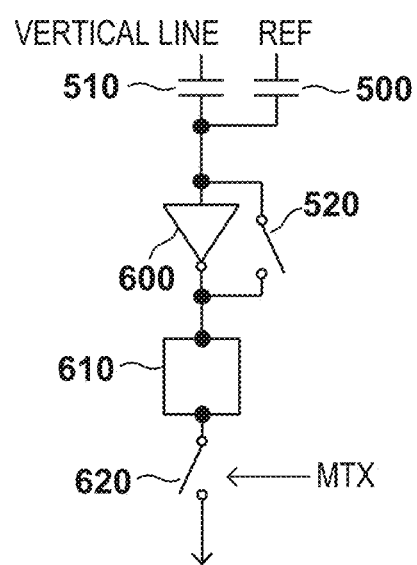
F I G. 7
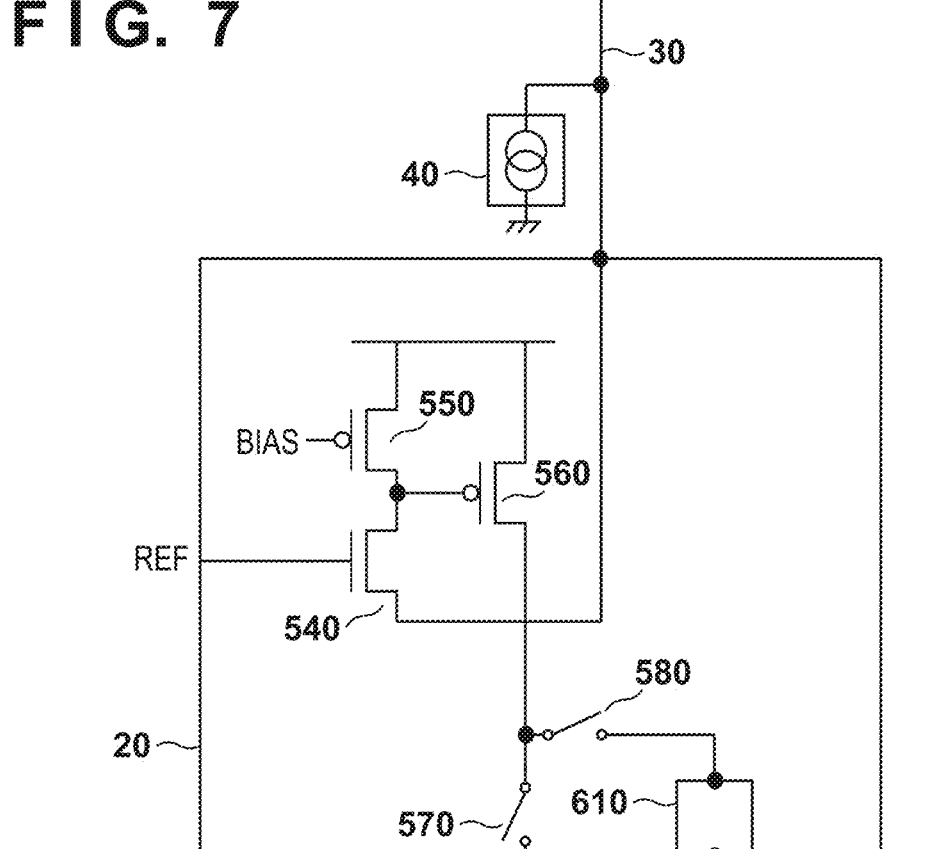

F I G. 9
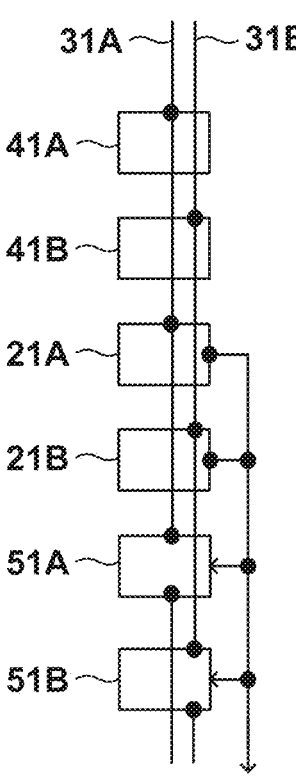

F I G.   10
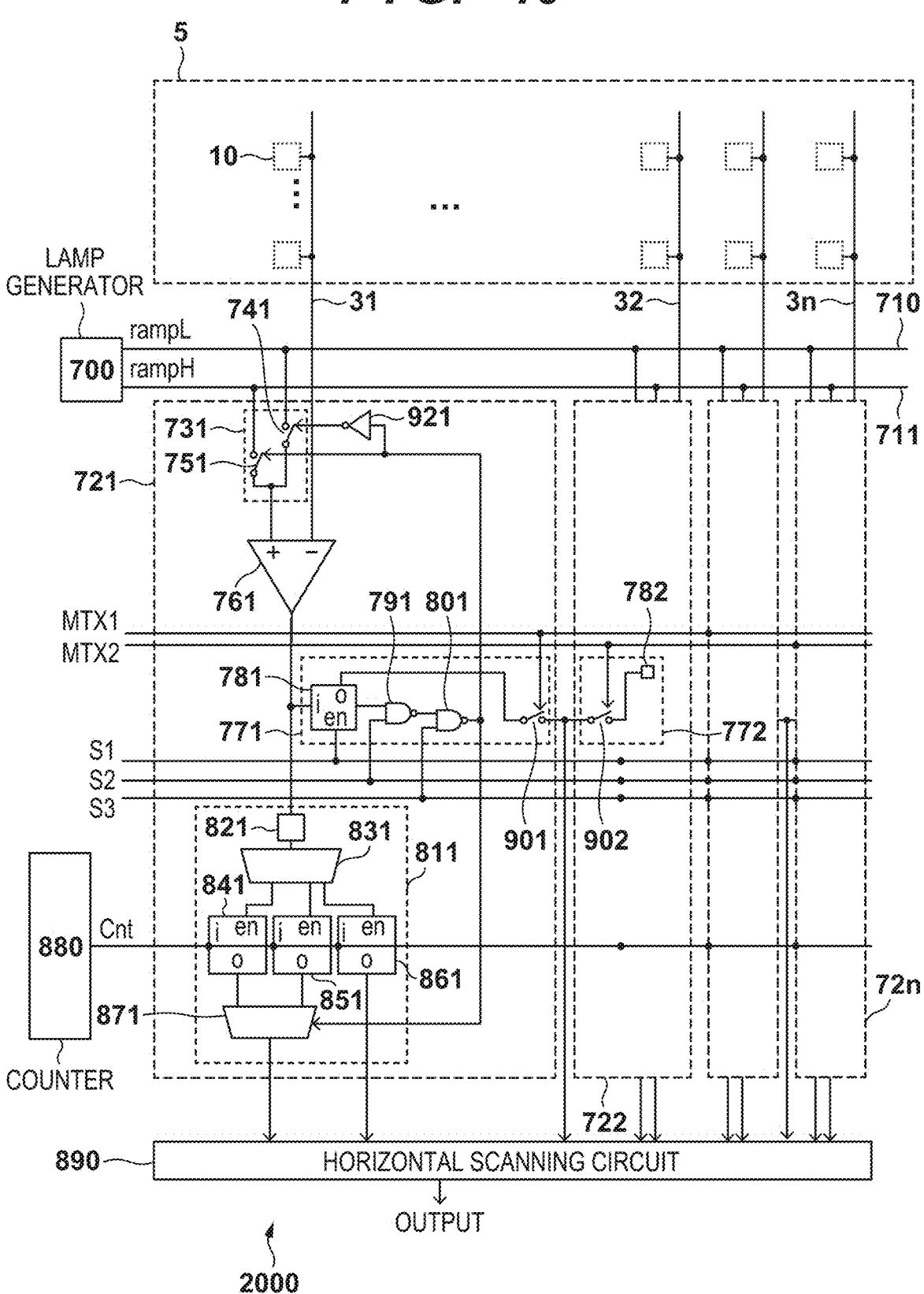

F I G.  11
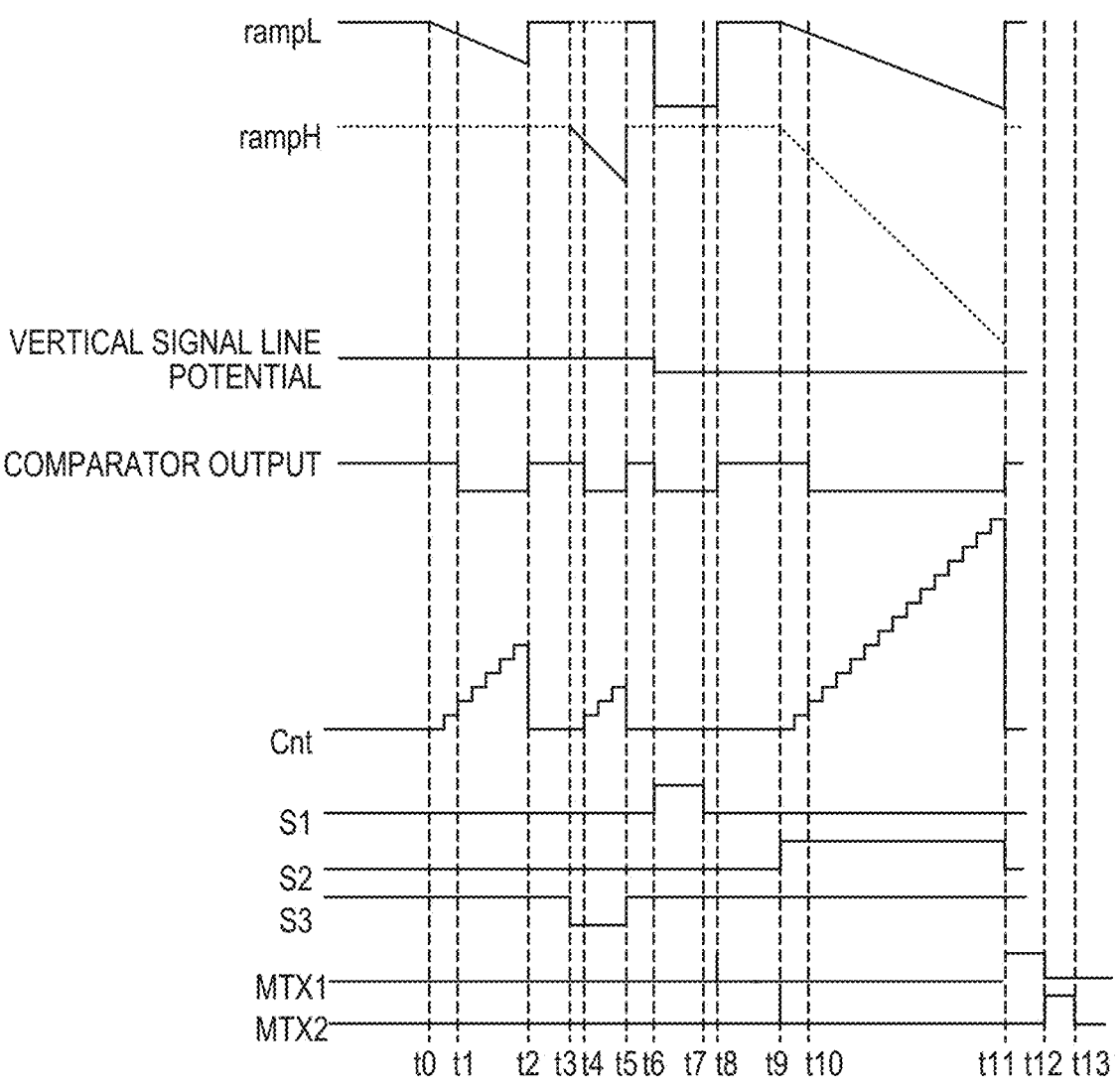

F I G. 12
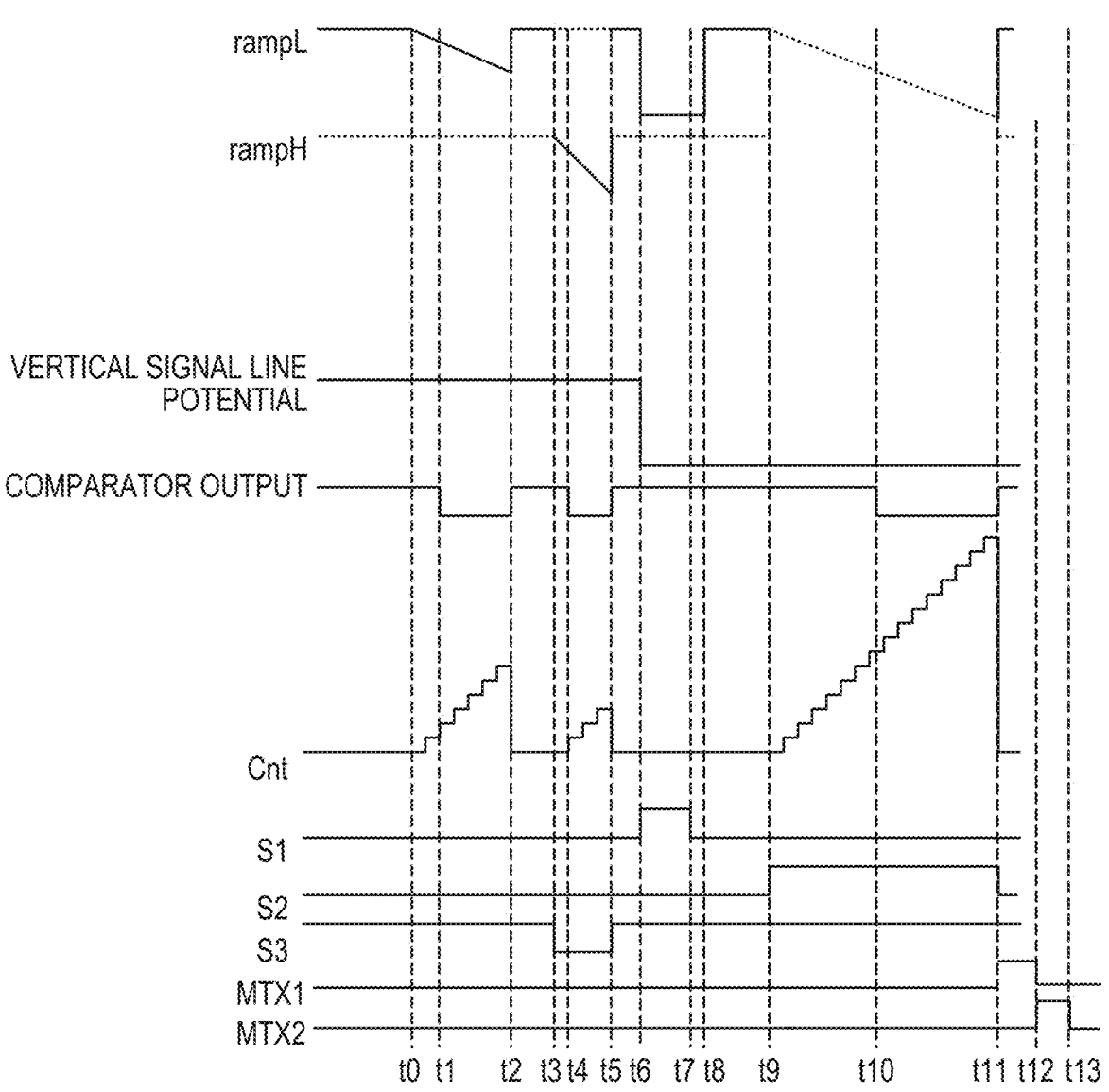

F I G. 13A
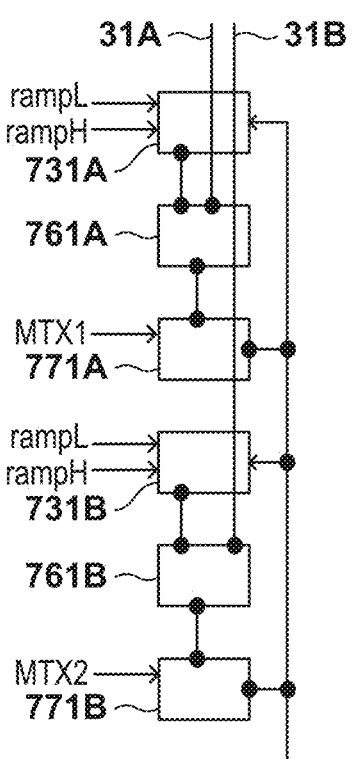
F I G. 13B
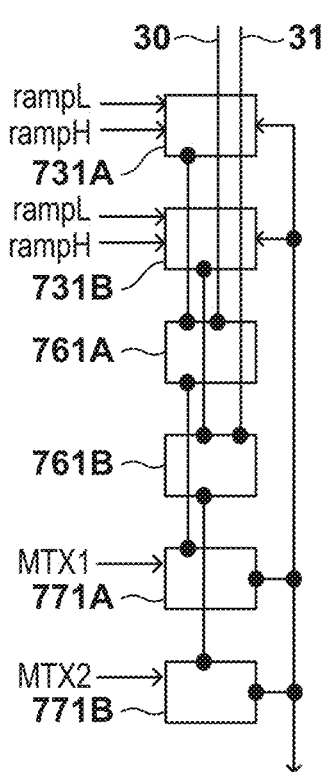
F I G. 14A
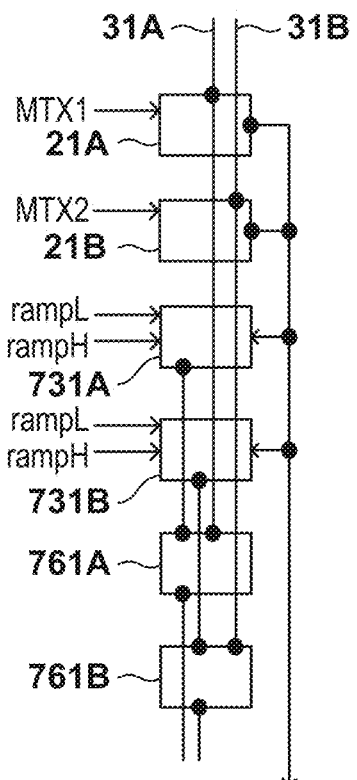
F I G. 14B
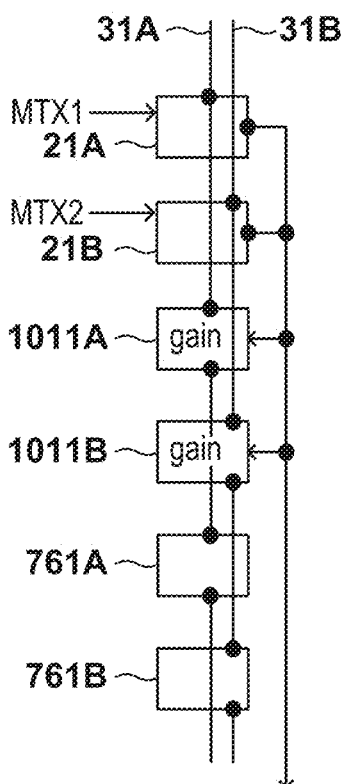

F I G. 14C
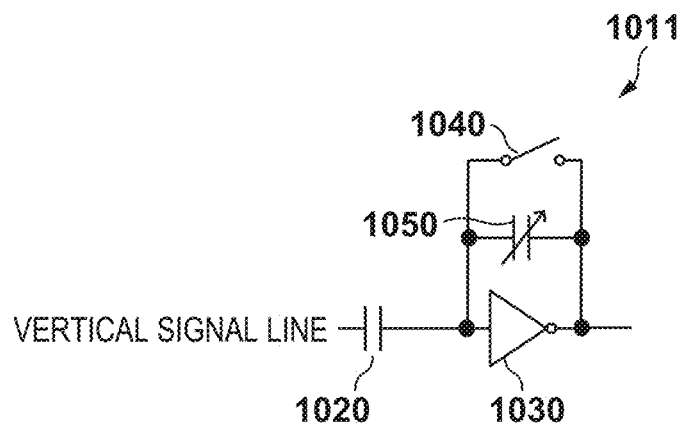
F I G. 15
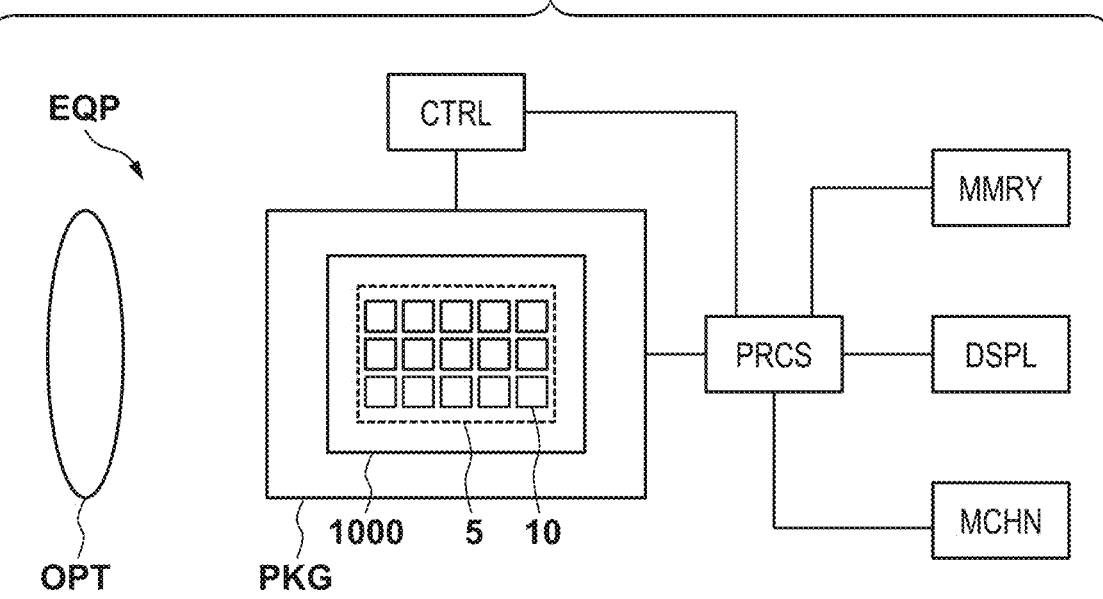

PHOTOELECTRIC CONVERSION DEVICE, ELECTRONIC DEVICE, AND SUBSTRATE

This application is a continuation of application Ser. No. 17/690,255 filed Mar. 9, 2022.

BACKGROUND OF THE INVENTION

Field of the Invention

The present invention relates to a photoelectric conversion device, an electronic device, and a substrate.

Description of the Related Art

In International Publication WO2019/069614A1, a solid-state image capture apparatus is described which includes a sample and hold unit with two sample and hold circuits in parallel for one vertical signal line and an analog-to-digital unit and an analog-to-digital unit configured to convert a pixel signal output from the sample and hold unit into a digital signal.

It is expected that the number of pixels in a solid-state image capture apparatus will keep continuing, and an increase in the number of pixels leads to an increase in the number of wires and peripheral circuits. On the other hand, making pixels smaller may cause a decrease in image quality. Thus, there is a demand for a configuration that can efficiently transmit data using a small number of wires and signals.

SUMMARY OF THE INVENTION

The present invention, in one aspect, provides a photoelectric conversion device and an electronic device capable of efficiently transmitting signals with a reduced number of wires.

According to an aspect of the present invention, there is provided a photoelectric conversion device, comprising: a pixel array including pixels each generates a signal via photoelectric conversion arranged in rows and columns; a plurality of determination circuits that perform determination of an amplitude of signals read out from the pixel array via different vertical signal lines; and a shared signal line shared by the plurality of determination circuits that transmits results of the determination from the plurality of determination circuits to a circuit inside the photoelectric conversion device.

According to another aspect of the present invention, there is provided an electronic device, comprising: a photoelectric conversion device; and a control apparatus that controls operations of the photoelectric conversion device, wherein the photoelectric conversion device comprising: a pixel array including pixels each generates a signal via photoelectric conversion arranged in rows and columns; a plurality of determination circuits that perform determination of an amplitude of signals read out from the pixel array via different vertical signal lines; and a shared signal line shared by the plurality of determination circuits that transmits results of the determination from the plurality of determination circuits to a circuit inside the photoelectric conversion device.

According to a further aspect of the present invention, there is provided a substrate stacked on a substrate provided with a pixel array including pixels each generates a signal via photoelectric conversion arranged in rows and columns, comprising: a plurality of determination circuits that perform determination of an amplitude of signals read out from the pixel array via different vertical signal lines; and a shared signal line shared by the plurality of determination circuits that transmits results of the determination from the plurality of determination circuits to a circuit other than the plurality of determination circuits provided on the substrate.

Further features of the present invention will become apparent from the following description of exemplary embodiments (with reference to the attached drawings).

BRIEF DESCRIPTION OF THE DRAWINGS

FIG. 1 is a block diagram illustrating an example configuration of a photoelectric conversion device according to a first embodiment.

FIG. 2 is a circuit diagram illustrating an example configuration of a pixel of the photoelectric conversion device of FIG. 1.

FIG. 3 is a circuit diagram illustrating an example configuration of a sample and hold unit and a conversion unit of the photoelectric conversion device of FIG. 1.

FIGS. 6A and 6B are circuit diagrams relating to other example configurations of the determination circuit of the photoelectric conversion device of FIG. 1.

FIG. 7 is a circuit diagram relating to yet another example configuration of the determination circuit of the photoelectric conversion device of FIG. 1.

FIG. 9 is a block diagram illustrating an example of a circuit arrangement in the photoelectric conversion device of FIG. 8.

FIG. 10 is a block diagram illustrating an example configuration of a photoelectric conversion device according to a second embodiment.

FIG. 11 is a timing diagram relating to an example operation of the photoelectric conversion device of FIG. 10.

FIG. 12 is a timing diagram relating to an example operation of the photoelectric conversion device of FIG. 10.

FIGS. 13A and 13B are block diagrams illustrating examples of a circuit arrangement in the photoelectric conversion device of FIG. 10.

FIGS. 14A to 14C are block diagrams illustrating examples of a circuit arrangement in the photoelectric conversion device of FIG. 10 according to a modified example.

FIG. 15 is a diagram illustrating an example configuration of a camera installed with a photoelectric conversion device according to an embodiment.

DESCRIPTION OF THE EMBODIMENTS

Figure 4:
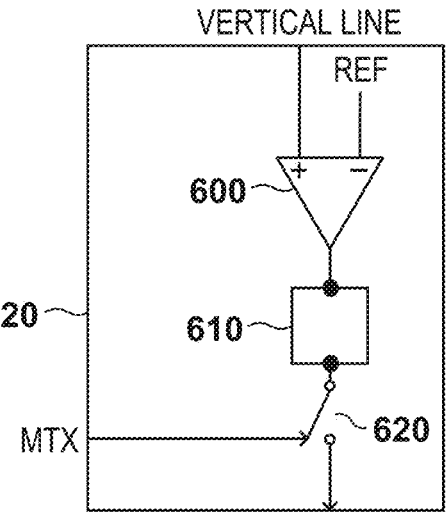
FIG. 4 is a circuit diagram illustrating an example configuration of a determination circuit of the photoelectric conversion device of FIG. 1.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

As illustrated in FIG. 1, a photoelectric conversion device 1000 has a structure in which a first substrate 1 and a second substrate 2 are electrically connected. The first substrate includes a pixel array 5. Also, the second substrate includes a current source 40, a determination circuit 20, a sample and hold unit (SH) 50, a conversion unit (AD) 60, a selection circuit (MUX) 70, a data processing circuit 90, and an output circuit 100. The photoelectric conversion device 1000 may be a CMOS image sensor, for example. Note that in the present specification, when collectively describing components of which a plurality exists, the reference sign X0 (X being an integer) may be used. For example, a description of vertical signal line/s 30 pertains to all of the vertical signal lines 31 to 3n.

In the pixel array 5, pixels 10 including a photoelectric conversion device such as a photodiode are arranged in rows and columns. Hereinafter, the left-and-right direction in FIG. 1 refers to the row direction or horizontal direction, and the up-and-down direction in FIG. 1 refers to the column direction or the vertical direction. Also, the groups of pixels arranged in the row direction in the pixel array 5 are referred to as pixel rows, and the groups of pixels arranged in the column direction are referred to as pixel columns. Furthermore, regarding the transfer direction of signals, the direction toward the pixels 10 is referred to as upstream or early stage, and the direction toward the output circuit 100 is referred to as downstream or later stage.

Each one of the pixels 10 generates a signal including a voltage value corresponding to the amount of incident light during exposure. Vertical signal lines 30 corresponding to pixel columns are provided in the pixel array 5. In FIG. 1, an example is illustrated in which one vertical signal line 30 is provided for each pixel column. However, a plurality of vertical signal lines 30 may be provided for each pixel column. The vertical signal line 30 transfers a signal from, from among the connected pixels 10, the pixel 10 belonging to the pixel row selected by an external vertical scanning circuit to the determination circuit 20 and the sample and hold unit 50.

One current source 40 is provided for each vertical signal line 30. The current source 40 supplies a bias current via the vertical signal line 30 to the pixel 10 selected for reading out of a signal.

The determination circuit 20 determines the amplitude of the signal supplied via the vertical signal line 30 and outputs a determination result. Amplitude represents the amount of change from a reference potential. Also, the amplitude may be determined by determining the magnitude relationship with a reference value, for example. The determination result may be used in the later stage processing by the photoelectric conversion device 1000 and the processing at an external circuit of the photoelectric conversion device 1000. The determination result may be used in accordance with the circuit that uses the determination result or the purpose, and how the determination result is used is not limited.

In the present embodiment, the determination circuit 20 is provided on each vertical signal line 30. Also, the determination circuits 20 connected to the adjacent vertical signal lines 30 share a signal line that transmits a determination result to a circuit inside the photoelectric conversion device 1000. The circuit inside the photoelectric conversion device 1000, which is the transmission destination of the determination result, is provided on the second substrate 2, for example, and is a circuit that is not the determination circuit 20. FIG. 1 is a diagram illustrating an example configuration in which two determination circuits 20 and 21 connected to two vertical signal lines 30 and 31 provided in adjacent pixel columns output a determination result to the data processing circuit 90 via a single shared signal line. However, three or more determination circuits 20 may be configured to output the determination result via the single shared signal line.

The sample and hold unit 50 is a holding circuit that samples and holds signals generated by the photoelectric conversion devices of the pixels 10 from the pixel array 5 and via the vertical signal lines 30. The sample and hold unit 50 includes a sample and hold circuit that samples and holds a reset signal and a sample and hold circuit that samples and holds a data signal, both being connected to the vertical signal line 30. The reset signal is a signal generated when the charge stored by the pixel is reset. Also, the data signal is a signal based on the charge generated in the exposure period by the photoelectric conversion device.

The selection circuit 70 is connected to a plurality of sample and hold units 50 and outputs, to the conversion unit 60, the signal held by one sample and hold unit corresponding to a selection signal MUX. In the example of FIG. 1, the sample and hold units 50 corresponding to two adjacent pixel columns are connected to a single selection circuit 70. Note that three or more sample and hold units 50 may be connected to a single selection circuit 70.

The conversion unit 60 is an A/D converter circuit that analog-to-digital converts a signal output from the selection circuit 70 and outputs a digital signal. Specific examples of an A/D converter circuit include a slope analog-to-digital conversion circuit, a successive-approximation analog-to-digital conversion circuit, a delta-sigma (ΔΣ) analog-to-digital conversion circuit, and the like. However, the A/D converter circuit is not limited thereto. The configuration illustrated in FIG. 1 corresponds to a configuration in which, because two sample and hold units 50 are connected to a single selection circuit 70, two sample and hold unit 50 share a single conversion unit 60. Note that three or more sample and hold units 50 may share a single conversion unit 60.

The data processing circuit 90 applies a predetermined processing to the digital signal output from the conversion unit 60 and performs an output. The data processing circuit 90 may apply digital gain to the digital signal, apply correction processing, apply complementation processing, and the like, for example.

The output circuit 100 outputs a digital signal processed at the data processing circuit 90 to outside of the photoelectric conversion device 1000.

As illustrated in FIG. 1, a single current source 40, determination circuit 20, and sample and hold unit 50 are provided on each vertical signal line 30. However, a single selection circuit 70 and conversion unit 60 are provided for a set of two vertical signal lines 30. Accordingly, in the example of FIG. 1, m=n/2.

Figure 2:
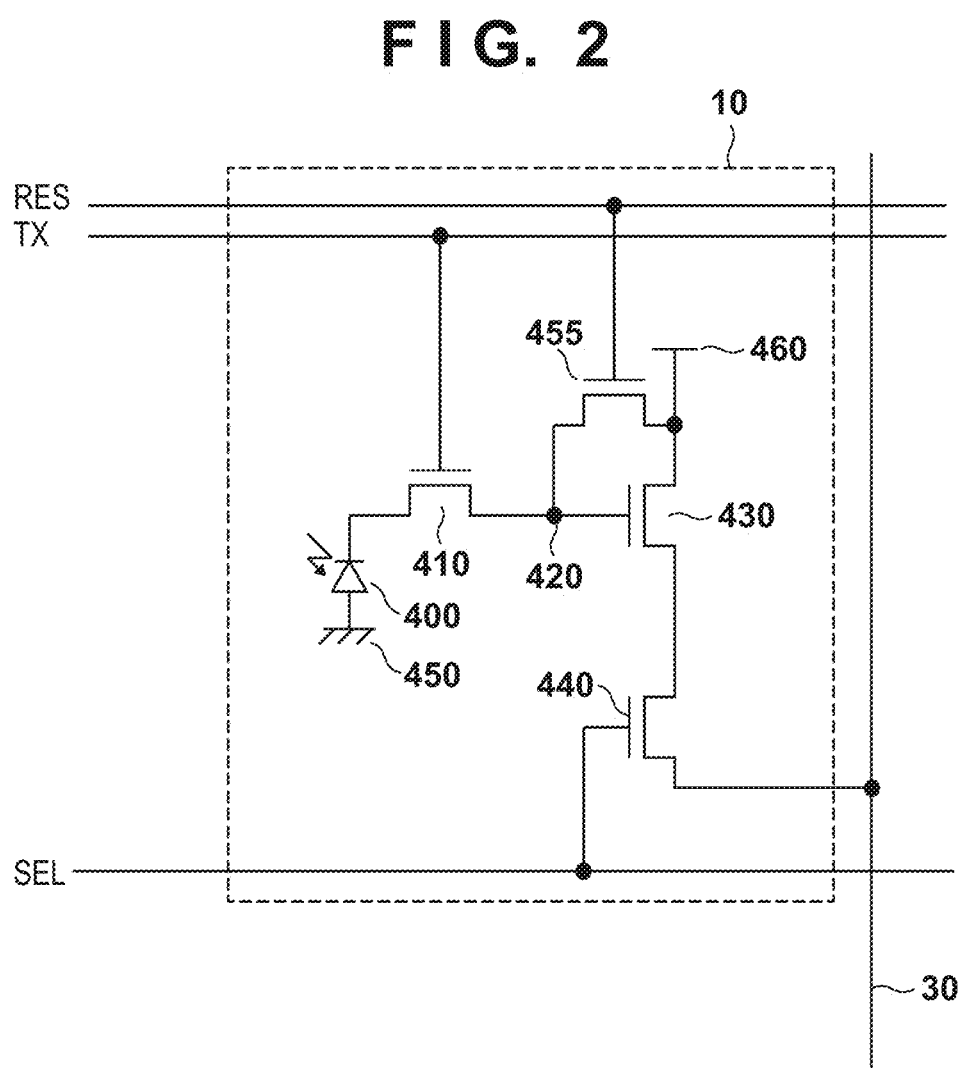

FIG. 2 is a circuit diagram illustrating an example configuration of the pixel 10. The pixel 10 includes a photoelectric conversion device 400 such as a photodiode, a transfer transistor 410, a reset transistor 455, an amplification transistor 430, and a selection transistor 440. The photoelectric conversion device 400 is connected to a ground potential 450 at one of the main electrodes and generates a signal charge (for example, a photoelectron) of an amount corresponding to the amount of received light. The other main electrode of the photoelectric conversion device 400 is electrically connected to a gate electrode of the amplification transistor 430 via the transfer transistor 410. A node 420 electrically connected to a gate electrode of the amplification transistor 430 functions as the floating diffusion (FD). The floating diffusion converts the charge generated at the photoelectric conversion device 400 to voltage.

The gate electrode of the transfer transistor 410 is supplied with a transfer signal TX. By the transfer transistor 410 being set to a conductive state in response to the transfer signal TX, a charge generated at the photoelectric conversion device 400 and stored by the photoelectric conversion device 400 is transferred to the node 420, i.e., the floating diffusion. The electric potential of the node 420 in a charge transferred state corresponds to the data signal described above.

The reset transistor 455 is connected between a power supply electric potential 460 and the node 420. In the present specification, a transistor being connected between A and B means that one of the main electrodes of the transistor is connected to A and the other is connected to B and that the gate electrode of the transistor is not connected to A or B.

A reset signal RES is supplied to the gate electrode of the reset transistor 455. By the reset transistor 455 being set to a conductive state in response to the reset signal RES, the electric potential of the node 420 (floating diffusion) is reset to the power supply electric potential 460. The electric potential of the node 420 with the reset transistor 455 in a conductive state corresponds to the reset signal described above.

Regarding the amplification transistor 430, the gate electrode is connected to the node 420, one of the main electrodes is connected to the power supply electric potential 460, and the other main electrode is connected to the selection transistor 440. The amplification transistor 430 is a source follower input circuit that outputs a signal generated via photoelectric conversion of the pixel 10 by the photoelectric conversion device 400 to the vertical signal line 30. Thus, the other one of the main electrodes of the amplification transistor 430 is electrically connected to the vertical signal line 30 via the selection transistor 440. The amplification transistor 430 and the current source 40 connected to the vertical signal line 30 form a source follower that converts a voltage of the node 420 to an electric potential of the vertical signal line 30.

The selection transistor 440 is connected between the amplification transistor 430 and the vertical signal line 30. The gate electrode of the selection transistor 440 is supplied with a selection signal SEL. By the selection transistor 440 being set in a conductive state in response to the selection signal SEL, the pixel 10 is set to a selected state. Thus, a signal is read out from the pixel 10 in a selected state to the vertical signal line 30.

The circuit configuration of the pixel 10 is not limited to the configuration illustrated in FIG. 2. For example, the selection transistor 440 may be connected between the power supply electric potential 460 and the amplification transistor 430. Also, in the configuration illustrated in FIG. 2, the pixel 10 has a four transistor (4Tr) structure including the transfer transistor 410, the reset transistor 455, the amplification transistor 430, and the selection transistor 440, but the structure is not limited thereto. For example, a 3Tr structure may be used in which the selection transistor 440 is omitted and the amplification transistor 430 functions as a selection transistor. Also, depending on the specifications required for the photoelectric conversion device 1000, a 5Tr or higher structure with a higher number of transistors may be used. From the pixel 10, the electric potential of the node 420 may be reset by the reset transistor 455, and a reset signal generated by the photoelectric conversion device 400 is reset and a data signal of a signal level of when the photoelectric conversion device 400 performed photoelectric conversion may be output in this order.

FIG. 3 is a diagram illustrating an example configuration of the photoelectric conversion device 1000 focusing on the circuit provided with the second substrate 2. Here, the circuits connected to the vertical signal lines 31 and 32 is illustrated as representatives. A sample and hold circuit 210 that samples and hold a reset signal and a sample and hold circuit 211 that samples and holds a data signal are connected to the vertical signal line 31. The sample and hold circuits 210 and 211 form the sample and hold unit 51. Also, the sample and hold circuit 212 that samples and hold a reset signal and the sample and hold circuit 213 that samples and holds a data signal are connected to the vertical signal line 32. The sample and hold circuits 212 and 213 form the sample and hold unit 52. The output of the sample and hold unit 51 is output to the selection circuit 70 from the sample and hold circuit 211, and the output of the sample and hold unit 52 is output to the selection circuit 70 from the sample and hold circuit 213.

A single determination circuit 20 and sample and hold unit 50 is provided on each vertical signal line 30. Thus, in a case where the number of vertical signal lines 30 is increased due to an increase in pixels, the space in which these circuits are disposed also increases. In the present embodiment, these circuits are disposed on the second substrate 2, which is different to the first substrate 1 with the pixel array 5 is provided, and the first substrate 1 and the second substrate 2 are stacked on one another. This helps reduce restrictions on circuit arrangement and allows the chip area to be made smaller.

The determination circuits 21 and 22 determine the amplitude of the signals read out from the pixels 11 and 12 to the vertical signal lines 31 and 32 using a reference value REF. The reference value REF, for example, is supplied to the determination circuits 21 and 22 from a reference value circuit 202 provided in the photoelectric conversion device 1000 or an external circuit. By having a plurality of types of the reference values REF, determination for a number of different uses can be performed.

Here, for example, the result of the amplitude determination is used in the automatic gain control (AGC) of the signals. Thus, the result of the determination is used in the control of analog gain (resistance values of a variable resistors 241 and 242) and the control of digital gain (multiplying factor or coefficient used at the data processing circuit 90). However, the use of the amplitude determination result is not limited to that described above, and output destination of the amplitude determination result may also be changed depending on the use.

The determination circuit 21 outputs the determination result in accordance with a control signal MTX1, and the determination circuit 22 outputs the determination result in accordance with a control signal MTX2. The control signals MTX1 and MTX2 can be supplied from a circuit (for example, a timing generator) inside the photoelectric conversion device 1000 or an external circuit of the photoelectric conversion device 1000. In the configuration of FIG. 3, the outputs of the determination circuits 21 and 22 are directly connected to a shared signal line. Thus, the control signals MTX1 and MTX2 are supplied in a manner such that the determination circuit 21 and the determination circuit 22 output the determination results in different periods.

Note that in the case of a configuration in which the determination circuit connected to a supply signal line can be switched using a switching circuit (switch), control signals are supplied to control the switching circuit so that that determination circuit 21 connects to the shared signal line in a first period and the determination circuit 22 connects to the shared signal line in a second period. Note that because determination result of the determination circuit 21 is a binary signal including a high level and a low level, a switching circuit with a simple configuration can be used. Specifically, the output of the sample and hold unit 50, which is the target of analog-to-digital conversion, can selectively have a smaller circuit size than the selection circuit 70 that supplies to the conversion unit 60.

The determination results from the determination circuits 21 and 22 are supplied to a circuit, the data processing circuit 90 for example, inside the photoelectric conversion device 1000 via the shared signal line. Note that the circuit that supplies the determination result may change depending on the use of the determination result. In the present embodiment, the plurality of determination circuits 20 output determination results via the same shared signal line. Thus, compared to a configuration in which the determination results are output via separate signal lines, the number of signal lines can be greatly reduced.

In particular, in the case of the example of FIG. 3 in which the data processing circuit 90, an internal circuit at a later stage than the analog-to-digital conversion circuit 390, uses the determination results, if a shared signal line is not used, many wires need to be run to the data processing circuit 90 via the analog-to-digital conversion circuit 390. In this case, wires running through the analog-to-digital conversion circuit 390 may become a source of noise, and thus it is advantageous to reduce the number of wires from the perspective of analog-to-digital conversion accuracy. Accordingly, the determination circuit 20 and the shared signal line are connected near the determination circuit 20, at least at a position closer to the pixel 10 than the selection circuit 70. This is the case for both examples in which a switching circuit is provided and examples in which a switching circuit is not provided.

The circuit configuration of the sample and hold unit 51 will now be described. The sample and hold circuit 210 for the reset signal includes a capacitive device 120 and an inverting amplifier 220. A switch 110 switches the connection state of the vertical signal line 30 and the capacitive device 120 between a connected state and a disconnected state in accordance with a control signal Smp_n. The inverting amplifier 220 may be constituted by a combination of a source ground circuit and a source follower circuit. The inverting amplifier 220 includes transistors 130, 140, 150, 160, switches 170, 180, 190, and a current source 200. The switch 170 is connected between the inverting input end and an output end of the inverting amplifier 220 and is controlled by a control signal Smpa_n. The reset signal is output from the inverting amplifier 220 in accordance with a control signal Hold_n.

The sample and hold circuit 211 for the data signal has a similar configuration to the sample and hold circuit 210 for the reset signal. Specifically, the sample and hold circuit 211 includes a capacitive device 121 and an inverting amplifier 221. A switch 111 switches the connection state of the vertical signal line 30 and the capacitive device 121 between a connected state and a disconnected state in accordance with a control signal Smp_s. The inverting amplifier 221 may be constituted by a combination of a source ground circuit and a source follower circuit. The inverting amplifier 221 includes transistors 131, 141, 151, 161, switches 171, 181, 191, and a current source 201. The switch 171 is connected between the inverting input end and an output end of the inverting amplifier 221 and is controlled by the control signal Smpa_s. The data signal is output from the inverting amplifier 221 in accordance with a control signal Hold_s.

A variable resistance device 241 is provided between the output end of the sample and hold circuit 210 for the reset signal and the output end of the sample and hold circuit 211 for the data signal. The resistance value of the variable resistance device 241 is controlled in accordance with the result of the determination by the determination circuit 21. For example, in a case where the amplitude of the signal is low (lower than the reference value REF1), the determination circuit 21 lowers the resistance value of the variable resistance device 241 than in a case where this is not the case. Accordingly, the gain is increased for the signal with a low amplitude, and dark noise in a captured image can be reduced.

The resistance value of the variable resistance device 241 is referred to as analog gain as it is the gain used for the analog signal. In a case where analog gain is changed, gain is applied at the data processing circuit 90 to offset this change. The gain applied by the data processing circuit 90 is referred to as digital gain as its target is the digital signal after A/D conversion. The value of the analog gain and the digital gain is set so that the product is one. Thus, in a case where the analog gain is made greater than 1, the digital gain is made less than 1.

A current I running in the variable resistance device 241 is:

$$I = (Vn - Vs)/R$$

wherein, Vn is the electric potential of the output end of the sample and hold circuit 210, i.e., the electric potential of the reset signal, Vs is the electric potential of the output end of the sample and hold circuit 211, i.e., the electric potential of the data signal, and R is the resistance value of the variable resistance device 240.

The current I is input to the analog-to-digital conversion circuit 390 via the selection circuit 71. The current I running in the variable resistance device 241 is proportional to the difference between the electric potential Vn of the reset signal of the pixel and the electric potential Vs of the data signal. Thus, the current I after correlated double sampling (CDS) is input to the analog-to-digital conversion circuit 390 of the conversion device 60. Also, by decreasing the resistance value R of the variable resistance device 241 below the reference value, a plus gain can be applied to the post-CDS data signal (Vn–Vs).

Note that a configuration other than the circuit configuration described here may be used. For example, a configuration that takes the output of the sample and hold circuits 210 and 211 as an input and uses a CDS circuit that obtains the difference between the data signal and the reset signal to obtain a post-CDS data signal may be used.

The sample and hold unit 52 (the sample and hold circuit 212 for the reset signal and the sample and hold circuit 213 for the data signal) connected to the vertical signal line 31 also has a similar configuration and operates in a similar manner.

The selection circuit 70 is connected to a plurality of the sample and hold units 50 and selectively supplies the output of a single sample and hold unit 50 in accordance with a control signal to the analog-to-digital conversion circuit 390 of the conversion unit 60. As illustrated in FIG. 3, the selection circuit 71 is connected to the two sample and hold units 51 and 52 and supplies the output of the sample and hold circuit 211 for the data signal or the sample and hold circuit 213 for the data signal in accordance with the control signal MUX1 and MUX2 to the analog-to-digital conversion circuit 390.

By providing the selection circuit 70, a plurality of the sample and hold units 50 can share the analog-to-digital conversion circuit 390. This allows the circuit size of the circuits mounted on the second substrate 2 to be greatly reduced compared to a configuration in which the analog-to-digital conversion circuit 390 is provided for each sample and hold unit 50.

In FIG. 3, as an example of the analog-to-digital conversion circuit 390 provided in the conversion unit 60, the analog-to-digital conversion circuit 390 is illustrated as a delta-sigma ($\Delta\Sigma$) analog-to-digital conversion circuit. The $\Delta\Sigma$ analog-to-digital conversion circuit 390 includes a first integrator, a second integrator, a quantizer 370, and a decimation filter 380. In the analog-to-digital conversion circuit 390, the first integrator is constituted by an integration capacitor 320. The second integrator is constituted by a Gm-cell 330 that converts voltage to current and an integration capacitor 360.

A digital-to-analog converter 305 including a current source 300 and a switch 310 is connected to the input node of the first integrator. The digital-to-analog converter 305 controls the current to the first integrator in accordance with a digital signal via the second integrator and the quantizer 370. A digital-to-analog converter 345 including a current source 340 and a switch 350 is connected to the input node of the second integrator. The digital-to-analog converter 345 controls the current to the second integrator in accordance with the result of quantization of the output of the second integrator by the quantizer 370.

In the $\Delta\Sigma$ analog-to-digital conversion circuit 390, the previous quantized value in the quantizer 370 is fed back to the second integrator and the first integrator via the digital-to-analog converters 305 and 345. In this manner, by feeding back the previous quantized value to the digital-to-analog converters 304 and 345 and passing it twice through the integrators, a second-order noise shaping characteristic can be obtained. Furthermore, by removing high-frequency noise via the decimation filter 380 disposed at a later stage than the quantizer 370, an analog-to-digital conversion output with high accuracy can be obtained.

The digital signal output from the decimation filter 380 is input to the data processing circuit 90. The data processing circuit 90 applies a predetermined processing, which includes applying digital gain, to the digital signal and outputs the result to the output circuit 100. The data processing circuit 90 controls the magnitude of the digital gain applied to the digital signal on the basis of the result of the first determination received from the determination circuit 20. The digital gain may be applied via multiplication of the value of the digital signal by the gain coefficient.

FIG. 4 is a diagram illustrating an example configuration of the determination circuit 20. The determination circuit 20 includes a comparator 600 that functions as a determination device; a latch 610, which is a storage unit that stores the output, i.e., the determination result, of the comparator 600; and a switch 620 provided between the latch 610 and an output line. The comparator 600 may be configured as a differential amplifier with a reference value being input at the inverting input and a data signal being input via the vertical signal line 30 at the non-inverting input. The comparator 600 outputs a high level or a low level depending on the magnitude relationship between the electric potential (amplitude of the signal) of the vertical signal line 30 and the reference value.

The latch 610 that stores the determination result outputs to the shared signal line when the switch 620 is set to on (conductive) by the control signal MTX. Note that in the case of a configuration in which the determination circuit 20 does not include a switch and the determination result is output to the shared signal line using a switching circuit connected to a plurality of the determination circuits 20, the control signal MTX controls the switching circuit to switch the selection circuit connected to the shared signal line.

The reference value REF used by the determination circuit 20 can be supplied from a reference value circuit 21 provided inside the photoelectric conversion device 1000 or from an external of the photoelectric conversion device 1000.

Figure 5:
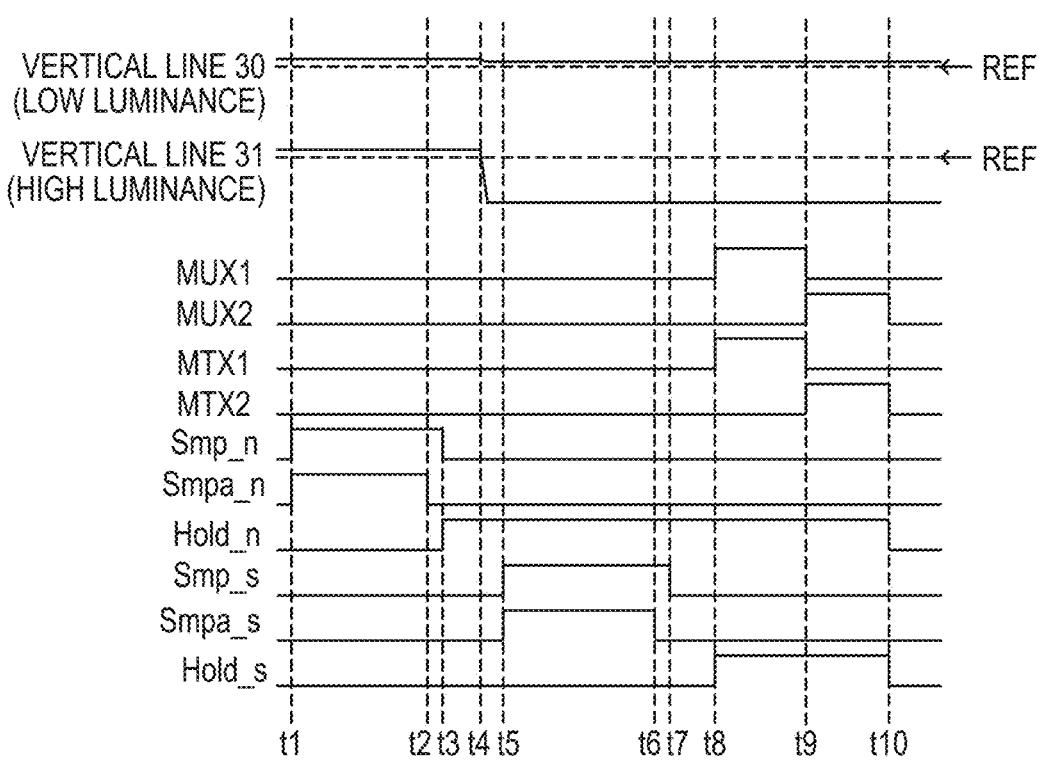
FIG. 5 is a timing diagram relating to an example operation of the photoelectric conversion device of FIG. 1.

FIG. 5 is a diagram illustrating an example of a change in the electric potential of the vertical signal line 30 in accordance with the magnitude of the amount of incident light of the selected pixel, the operation timing of the switches of the sample and hold circuits 210 and 211, and the control signals MTX and MUX.

Here, three examples of the change in electric potential of the vertical signal line 30 are illustrated, namely an example in which the amount of incident light of the pixel 10 is small (low luminance), an example in which the amount is large (high luminance), and an example in which the amount is very large (ultra-high luminance). Note that ultra-high luminance corresponds to a state in which a phenomenon (called blooming) where the charge generated at the photoelectric conversion device of the pixel overflows into the floating diffusion occurs. Low luminance and high luminance are typical examples with a small amount of incident light and a large amount of incident light, respectively, within a range in which blooming does not occur. In the present embodiment, the pixel 10 stores electrons via photoelectric conversion. Thus, the electric potential of the vertical signal line 30 decreases further from the reference potential the larger the amount of incident light of the pixel 10.

Control signals Smp_n, Smpa_n, Hlod_n, smp_s, smpa_s, hlod_s in FIG. 5 are control signals of the switches in FIG. 3 with the same name. Here, while the control signal is a high level, the corresponding switch is set to an on state (conductive state), and while the control signal is a low level, the corresponding switch is set to an off state (non-conductive state).

First, at time t1, the control signals Smp_n and Smpa_n are set to a high level, and, at the sample and hold circuit 210 for the reset signal, the switches 110 and 170 are set to an on state. Next, at time t2 when the control signal Smpa_n transitions from high level to low level, the electric potential Vn of the reset signal is sampled and stored in the capacitive device 120.

Next, at time t3, the control signal Smp_n transitions from high level to low level. Also, by the control signal Hold_n being high level and the switches 180 and 190 being set to an on state, at the sample and hold circuit 210, the capacitive device 120 holds the electric potential Vn of the reset signal. The charge sampled and held by the capacitive device 120 is output from the sample and hold circuit 210 for the reset signal.

At time t4, the signal generated at the photoelectric conversion device 400 is output from the pixel 10 to the vertical signal line 30. Next, at time t5, the control signals Smp_s and Smpa_s are set to a high level, and, at the sample and hold circuit 211 for the data signal, the switches 111 and 171 are set to an on state. Next, at time t6 when the control signal Smpa_s transitions from high level to low level, the electric potential Vs of the data signal is sampled and stored in the capacitive device 121. The determination circuit 20 determines the amplitude in the period from time t5 to t6.

Next, at time t7, the control signal Smpa_s transitions from high level to low level. Also, at time t8, by the control signal Hold_n being high level and the switches 181 and 191 being set to an on state, at the sample and hold circuit 211, the capacitive device 121 holds the electric potential Vs of the data signal. The charge sampled and held by the capacitive device 121 is output from the sample and hold circuit 211 for the data signal.

As described above, a current corresponding to the difference between the electric potential Vn of the reset signal at the output end of the sample and hold circuit 210 and the electric potential Vs of the data signal at the output end of the sample and hold circuit 211 is input into the analog-to-digital conversion circuit 390.

Also, at time t8, the control signals MUX1 and MTX1 transition from low level to high level. The control signals MUX2 and MTX2 stay at low level. In this manner, the output of the sample and hold unit 51 is input to the conversion unit 60 via the selection circuit 70, and the determination result of the determination circuit 21 is input to the data processing circuit 90 via the shared signal line.

Next, at time t9, the control signals MUX1 and MTX1 transition to low level, and the control signals MUX2 and MTX2 transition from low level to high level. In this manner, the output of the sample and hold unit 52 is input to the conversion unit 60 via the selection circuit 70, and the determination result of the determination circuit 22 is input to the data processing circuit 90 via the shared signal line.

At time t10, the control signals Hold_n, Hold_s, MUX2, and MTX2 are low level, and sampling of the reset signal and the data signal of the next pixel 10 is started.

Next, the relationship between the magnitude of the amount of incident light of the pixel and the amplitude determination result at the determination circuit 20 will be described. Here, the reference value REF supplied is used for AGC control. Thus, the reference value REF includes a predetermined value for detecting the signal of a luminance level included in a range in which the analog gain is increased.

In a case where the amount of incident light of the pixel is small and a signal corresponding to low luminance is output, the decrease in the electric potential of the vertical signal line 30 at time t4 is small, and the electric potential does not decrease below the reference value REF. As a result, the comparator 600 of the determination circuit 20 outputs a high level as the result of the determination. This means that the read out data signal is a signal in the luminance range in which the analog gain is increased.

In a case where there is a large amount of incident light and a signal corresponding to high luminance is output, the decrease in the electric potential of the vertical signal line 30 at time t4 is large, and the electric potential decreases below the reference value REF. As a result, the comparator 600 of the determination circuit 20 outputs a low level as the result of the determination. This means that the read out data signal is not a signal in the luminance range in which the analog gain is increased.

The determination result is held in the latch 610 and can be used in the later stage processing in the photoelectric conversion device 1000 and/or the processing outside of the photoelectric conversion device 1000. Here, the result of the determination is used in the adjustment of the resistance value (analog gain) of the variable resistance device 240 by the determination circuit 20 and in the adjustment of the digital gain applied at the data processing circuit 90. For example, in regard to a low luminance data signal, the analog gain can be set to eight times (×8) the reference value (×1) and the digital gain can be set to ⅛ (×⅛) of the reference value (×1). Also, as described above, the purpose of the determination is not limited to AGC control as used in this example. Furthermore, two or more types of determination may be performed. For example, the low-luminance range may be divided, and the types of determination may be increased to perform AGC control in a more detailed manner.

Because a determination circuit is provided that determines the amplitude of the signal read out from the pixel to the vertical signal line, the photoelectric conversion device of the present embodiment is capable of executing appropriate processing on the basis of the determination result inside or outside the photoelectric conversion device.

First Modified Example

In a case where the comparator 600 used by the determination circuit 20 is implemented via a differential amplifier, a decrease in accuracy may be caused by input offset. Thus, by using the comparator 600 with a configuration that corrects input offset, the determination accuracy can be increased. FIGS. 6A and 6B are diagrams illustrating example configurations of a comparator capable of correcting input offset that can be used as the comparator 600 of the determination circuit 20.

The comparator 600 in FIG. 6A includes two capacitive devices 500, 510 for input and feedback switches 520 and 530. The feedback switch 520 includes one end connected to an inverting input terminal and the other end connected to a non-inverting output terminal. The feedback switch 530 includes one end connected to a non-inverting input terminal and the other end connected to an inverting output terminal.

Note that the output of the comparator 600 is a non-inverting output terminal, and the terminal is connected to the input terminal of the latch 610. The capacitive device 500 is connected to the inverting input terminal, and the capacitive device 510 is connected to the non-inverting input terminal. The reference value is supplied to the inverting input terminal via the capacitive device 500, and the vertical signal line 30 is connected to the non-inverting input terminal via the capacitive device 500.

In a state where the reset signal is supplied to the non-inverting input and the reference value REF is supplied to the inverting input, in this state, the switches 520 and 530 are turned on (made conductive) and then turned off to give the capacitive devices 500 and 510 the same electric potential difference. This allows the input offset voltage of the comparator 600 to be cancelled. The determination result held in the latch 610 is output when the switch 620 changes to a conductive state.

The configuration of FIG. 6B is the same as that of FIG. 6A, except that the differential amplifier forming the comparator 600 is a single-ended differential amplifier. Even with this configuration, in a state where the reset signal is supplied to the non-inverting input and the reference value REF is supplied to the inverting input, in this state, the switches 520 and 530 are turned on (made conductive) and then turned off. This allows the input offset voltage of the comparator 600 to be cancelled.

Note that the comparator 600 may have a discretionary known configuration for a so-called auto-zero differential amplifier. The configurations illustrated in FIGS. 6A and 6B are merely examples.

Second Modified Example

FIG. 7 is a diagram illustrating a configuration in which the determination circuit 20 is driven by the current source 40 of the vertical signal line 30, allowing for a decrease in power consumption compared to a configuration in which the determination circuit 20 is driven by a different power supply.

The comparator includes an N-type MOS transistor 540, P-type MOS transistors 550 and 560, and a reset switch 570. The vertical signal line 30 is connected to the source of the transistor 540, and the reference value REF is input into the gate. Also, the transistor 550 is connected to the power supply voltage and the transistor 540, and a bias voltage is applied to the gate. The transistor 560 is connected to the power supply voltage and the latch 610, and the voltage of the connection point between the transistors 540 and 550 is applied to the gate. The output of the transistor 560 is input into the latch 610. Also, the reset switch 570 is a switch that resets the latch 610 when on. The determination result held in the latch 610 is output when the switch 620 changes to a conductive state.

When the electric potential of the vertical signal line 30 decreases to equal to or less than (reference voltage REF-threshold voltage Vth of the transistor 540), the transistor 540 turns on. When the transistor 540 is turned on, the current flows toward the current source 40. Accordingly, the gate voltage of the transistor 560 is decreased and the transistor 560 is turned on. Because of this, the latch 610 remains a high level. Also, in a case where determination is performed a number of times, the reset switch 570 is turned to on and the previous determination result is reset before performing a new determination.

According to this present modified example, because the determination circuit 20 is driven by the current source 40 of the vertical signal line 30, power consumption can be reduced.

Third Modified Example

Figure 8:
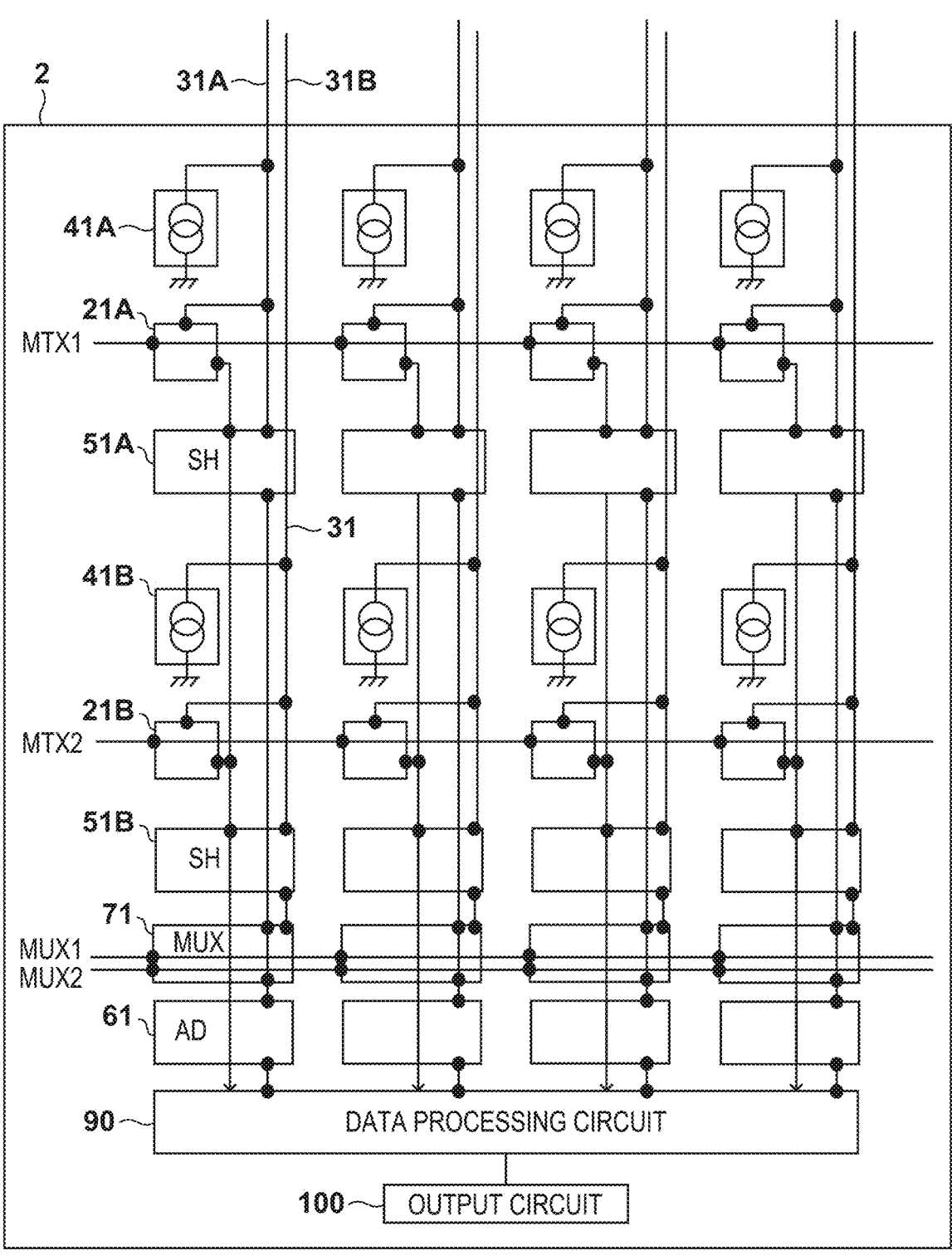
FIG. 8 is a block diagram illustrating another example configuration of a photoelectric conversion device according to a first embodiment.

FIG. 8 is a diagram illustrating an example configuration of the photoelectric conversion device 1000 provided with a plurality of vertical signal lines for each pixel column. The pixel array provided on the first substrate 1 is omitted from the diagram, and only an example of the circuit configuration of the second substrate 2 is illustrated. Also, components already described are given the same reference sign as in FIG. 1.

In this example, two vertical signal lines 30A and 30B are provided for each pixel column, and the vertical signal lines 30A and 30B are connected to different pixel rows. Also in this example, the vertical signal line 30A is connected to odd numbered pixel rows and the vertical signal line 30B is connected to even numbered pixel rows. However, the number of vertical signal lines per pixel column and the connection pattern of what pixel rows they are connected to it not particularly limited.

With such a configuration, the determination circuits provided on the plurality of vertical signal lines provided on the same pixel column is capable of outputting the determination result via a shared signal line. In the example illustrated in FIG. 8, at the pixel column on the left end, the determination results of a determination circuit 21A connected to the vertical signal line 31A and a determination circuit 21B connected to the vertical signal line 31B are transmitted to the data processing circuit 90 via a shared signal line. The control signal MTX1 is input into the determination circuit 21A and the control signal MTX2 is input into the determination circuit 21B, and control is executed so that the determination results are output to the shared signal line in different periods.

Also, the conversion unit 60 is provided for each pixel column and is shared by sample and hold units 50A and 50B connected to the plurality of vertical signal lines connected to the same pixel column. Thus, the selection circuit 70 is also provided for each pixel column, and the signal held at the sample and hold units 50A and 50B is selectively output to the conversion unit 60 in accordance with the control signals MUX1 and MUX2.

The present modified example has a configuration different to the configuration of the FIG. 1 in that a plurality of determination circuits that output a determination result via a shared signal line and a plurality of sample and hold units that share a conversion unit are provided for the same pixel column and that the selection circuit 70 and the conversion unit 60 are provided for each pixel column. However, the control signal supplied to the switches of the determination circuit 20, the selection circuit 70, and the sample and hold unit 50 may be the same as that illustrated in the time chart of FIG. 5.

Also, in the present modified example, the number of signal lines for transmitting the determination results from the plurality of determination circuits can be reduced. Furthermore, by the conversion unit being shared by a plurality of sample and hold units, the number of conversion units can be reduced.

Fourth Modified Example

FIG. 9 is a diagram illustrating another example of the circuit arrangement relating to the pixel column on the left end of FIG. 8. Specifically, in a case where a plurality of the same type of circuits are provided for the same pixel column, the same type of circuits are disposed close to one another. With such a circuit arrangement, variation in the characteristics of the circuits caused by the manufacturing process can be suppressed.

In the example of FIG. 9, the plurality of circuits of the same type provided for the same pixel column are the current source, the determination circuit, and the sample and hold unit, and the current sources 41 and 42, the determination circuits 21 and 22, and the sample and hold units 51 and 52 are disposed in this order from closest to the pixel array. Note that in FIG. 9, circuits with only one provided per pixel column, such as the conversion unit 60 and the selection circuit 70, are omitted from the diagram but are connected downstream from the sample and hold units 51 and 52.

According the present modified example, in addition to the effects of the third modified example, the conversion performance of the conversion unit can be improved.

As described above, the photoelectric conversion device according to the present embodiment includes a determination circuit that determines the amplitude of a signal read out from a pixel or an amplitude of a signal based on the read out signal. At the determination circuit, various types of amplitude determination are performed or amplitude determination is performed at various different timings. Thus, either inside or outside the photoelectric conversion device, appropriate processing can be executed on the basis of the determination result. By using the determination result, for example, blackened (blackened high luminance pixel) detection and adjustment of gain applied to the data signal can be achieved and image quality improvement can be achieved.

Second Embodiment

Next, the second embodiment of the present invention will be described. FIG. 10 is a diagram illustrating an example configuration of a photoelectric conversion device 2000 according to the second embodiment. Also, components that are the same as in the first embodiment are given the same reference sign as in FIG. 1. The photoelectric conversion device 2000 of the present embodiment includes a conversion unit 720 (721 to 72*n*), which is a slope analog-to-digital conversion circuit, for each pixel column or vertical signal line 30 (31 to 3*n*). Also, the photoelectric conversion device 2000 includes a ramp generator 700.

The slope analog-to-digital conversion circuit compares a signal for conversion and a ramp signal with an electric potential that changes over time and obtains a post-conversion digital value on the basis of the time taken for the magnitude relationship of the two to change, for example. Single slope refers to using one type of ramp signal, and multi-slope refers to being able to use a plurality of types of ramp signals. In this example, from among the multi-slope analog-to-digital conversion circuits, a dual slope analog-to-digital conversion circuit that uses two types of ramp signals is used.

Specifically, the ramp generator 700 generates a first ramp signal rampL and a second ramp signal rampH with different amounts of change in electric potential per unit time and supplies these to the conversion units 721 to 72*n* via a first wire 710 and a second wire 711. In this example, the second ramp signal rampH has a greater amount of change in electric potential per unit time than the first ramp signal rampL.

With a multi-slope analog-to-digital conversion circuit, a ramp signal appropriate for analog-to-digital conversion of a data signal can be selected in accordance with the amplitude determination result of the data signal. With such a multi-slope analog-to-digital conversion circuit, because the wire for transmitting the amplitude determination result to the circuits inside the photoelectric conversion device 2000 are shared by a plurality of conversion units, the number of signal lines can be reduced. In this example, the internal circuit that transmits the result of the amplitude determination is a horizontal scanning circuit 890.

Because the conversion units 721 to 72*n* all have the same configuration, the configuration of the conversion unit 721, a representative, will be described. The conversion unit 721 includes a comparator 761, a selection unit 731, a column control unit 771, and an inverter 921.

The selection unit 731 includes a switch 741 and a switch 751. The column control unit 771 includes a memory 781, a NAND gate 791, a NAND gate 801, and a switch 901. A control signal s1, a control signal s2, and a control signal s3 are supplied to the memory 781, the NAND gate 791, and the NAND gate 801 of the column control unit 771, respectively, from a non-illustrated timing generator, for example.

Also, the output of the column control unit 771 is supplied to a memory unit 811, the selection unit 731, and the horizontal scanning circuit 890. The control signal MTX1 is supplied to the switch 901 from the timing generator. The switch 901 is set to on (conductive) when the control signal MTX1 is a high level. Note that the control signal MTX1 is supplied to the conversion units 720 of odd numbered pixel columns, and the control signal MTX2 is supplied to the conversion units 720 of even numbered pixel columns. When the switch 901 is on, the amplitude determination result held by the column control unit 771 is output to the horizontal scanning circuit 890. When the switch 902 is on, the amplitude determination result held by the column control unit 772 is output to the horizontal scanning circuit 890.

The switches 901 and 902 are connected to a shared signal line. Thus, the signal line for transmitting the amplitude determination result held by the column control units 771 and 772 includes the shared signal line. By the control signals MTX1 and MTX2 being supplied so that either the switch 901 or the switch 902 is exclusively on, the amplitude determination results of the plurality of conversion units 720 can be output to the horizontal scanning circuit 890 using a single signal line. In this manner, according to the present embodiment, the number of signal lines for transmitting the amplitude determination result can be reduced.

The memory unit 811 includes a pulse generator 820, a selector 831, a memory 841, a memory 851, a memory 861, and a selector 871.

Also, the photoelectric conversion device 2000 further includes a counter 880 that outputs a count signal Cnt of the clock count to the conversion units 721 to 72*n* and the horizontal scanning circuit 890 that reads out the digital signals from the conversion units 721 to 72*n*.

Next, the operation of the conversion unit 720 will be described using FIGS. 11 and 12. The conversion unit 720 of the present example selects either the first ramp signal rampL or the second ramp signal rampH on the basis of the magnitude of the signal output by the pixel 10 according to the incident light and uses the selected signal in analog-to-digital conversion.

First, using FIG. 11, the operation when a signal output by the pixel 10 in a case where the incident light has low luminance is analog-to-digital converted will be described. In the present embodiment also, the photoelectric conversion device of the pixel 10 stores electrons via photoelectric conversion.

At time to, the control signal s2 is a low level and the control signal s3 is a high level. Thus, the output of the column control unit 771 (NAND gate 801) is set to a low level. Accordingly, at the selection unit 731, the switch 741 is set to on and the switch 751 is set to off. The first ramp signal rampL is input into the non-inverting input of the comparator 761 via the first wire 710.

Also, the electric potential of the vertical signal line 30 corresponds to the electric potential of the reset signal of the pixel 10. Thus, the voltage of the non-inverting input of the comparator 761 is greater than the voltage of the inverting input, and the comparator 761 outputs a high level.

In the period from time t0 to time t2, the ramp generator 700 reduces the electric potential of the first ramp signal rampL by a first change amount. Hereinafter, the reset electric potential of the first ramp signal rampL and the second ramp signal rampH is referred to as the ramp reset electric potential. Also, the starting time of the change in the electric potential of the first ramp signal rampL and the second ramp signal rampH is referred to as the ramp starting time. Furthermore, the counter 880 starts the count up of the count signal Cnt in sync with the ramp starting time. In this example, the counter 880 starts the count up of the count signal Cnt in sync with the ramp starting time of the first ramp signal rampL. Hereinafter, the count up starting time of the counter 880 is referred to as the counter starting time. Ideally, the ramp starting time and the counter starting time match.

At time t1, the electric potential of the first ramp signal rampL decreases below the electric potential of the vertical signal line 31. This changes the output of the comparator 761 from a high level to a low level. The pulse generator 821 generates a pulse (one shot pulse) that is a high level only in a predetermined period in accordance with a change in the output of the comparator 761. The predetermined period is typically a length corresponding to a number of cycles of the clock. The selector 831 supplies the pulse to the memory 841. Via this operation, the count signal Cnt is written to the memory 841 at time t1. This is a digital signal obtained as an analog-to-digital conversion result using the first ramp signal rampL with respect to the reset level.

At time t2, the ramp generator 700 resets the electric potential of the first ramp signal rampL to the ramp reset electric potential. This changes the output of the comparator 761 from a low level back to a high level. Also, the counter 880 resets the count signal Cnt to the value of the counter starting time.

Thereafter, at time t3, the non-illustrated timing generator sets the control signal s3 to a low level. Accordingly, the output of the column control unit 771 is set to a high level, the switch 741 of the selection unit 731 is set to off, and the switch 751 is set to on. Thus, the second ramp signal rampH is input into the non-inverting input node of the comparator 761 via the second wire 711.

In the period from time t3 to time t5, the ramp generator 700 reduces the electric potential of the second ramp signal rampH by a second change amount greater than the first change amount. Also, the counter 880 counts up the count signal Cnt in sync with the start of a change in the electric potential of the second ramp signal rampH.

At time t4, the electric potential of the second ramp signal rampH decreases below the electric potential of the vertical signal line 30. This changes the output of the comparator 761 from a high level to a low level. The pulse generator 820 generates a pulse (one shot pulse) that is a high level only in a predetermined period in accordance with a change in the output of the comparator 761. The selector 831 supplies the pulse to the memory 851. Via this operation, the count signal Cnt is written to the memory 851 at time t4. This is a digital signal obtained as an analog-to-digital conversion result using the second ramp signal rampH with respect to the reset level.

At time t5, the second ramp signal rampH and the count signal Cnt are reset. The output of the comparator 761 changes from a low level back to a high level. Also, by the control signal s3 changing back to a high level, the output of the column control unit 771 is set to a low level, the switch 741 is set to on, and the switch 751 is set to off. Accordingly, the first ramp signal rampL is again input into the non-inverting input of the comparator 761.

In the period from time t5 to time t6, the pixel 10 starts outputting a data signal. Because of this, the electric potential of the vertical signal line 31 is reduced in accordance with the incident light of the pixel 10. Though not illustrated, at an earlier stage than the comparator 761, a correlated double sampling (CDS) circuit may be provided. In this case, a signal corresponding to the data signal minus the noise signal of the pixel 10 is input into the comparator 761. Also, an amplifier may be provided at an earlier stage than the comparator 761. In this case, a signal obtained by amplifying the data signal generated by the pixel 10 is input into the comparator 761.

At time t6, the ramp generator 700 reduces the electric potential of the first ramp signal rampL to a determination threshold level. The determination threshold corresponds to the reference value REF in the first embodiment. The comparator 761 compares the determination threshold and the data signal. In this manner, in the present embodiment, the comparator 761 of the slope analog-to-digital conversion circuit is used as the determination circuit 20 in the first embodiment. Thus, it is not necessary to also provide the determination circuit 20, which is advantageous from the perspective of mounting area and the like.

As described above, FIG. 11 is a diagram illustrating an example in which the signal output by the pixel 10 in a case where the incident light has low luminance is analog-to-digital converted. Thus, the electric potential of the vertical signal line 31 is greater than the first ramp signal rampL. In other words, the amplitude of the vertical signal line 31 is less than the amplitude of the determination threshold of the first ramp signal rampL. Thus, the output of the comparator 761 is set to a low level. At this time, by the control signal s1 being set to a high level from time t6 to time t7, the low level, i.e., the determination result, is written to the memory 781.

At time t8, the ramp generator 700 sets the first ramp signal rampL back to the electric potential of when ramp started. This changes the output of the comparator 761 back to a high level.

Then, at time t9, the non-illustrated timing generator sets the control signal s2 to a high level. Accordingly, the determination result written to the memory 781 is reflected in the connection state of the switch in the selection unit 731.

Here, by a low level being written to the memory 781, at the selection unit 731, the switch 741 is set to on and the switch 751 is set to off. Thus, the non-inverting input node of the comparator 761 is connected to the first wire 710, and the first ramp signal rampL is input.

From time t9 onward, the ramp generator 700 reduces the electric potential of the first ramp signal rampL by the first change amount. Also, the counter 880 counts up the count signal Cnt. At time t10, the output of the comparator 761 changes to a low level. Accordingly, the analog-to-digital conversion result using the first ramp signal rampL of the signal based on the optical signal is written to the memory 861.

At time t11, the first ramp signal rampL and the count signal Cnt are reset. In the example illustrated in FIG. 2, using the determination result written to the memory 781, the analog-to-digital conversion result written to the memory 841 is selected and output from the selector 871. In other words, the analog-to-digital conversion result corresponding to the reset level generated using the ramp signal with the same electric potential change amount per unit time as the ramp signal used in analog-to-digital conversion of the signal based on the optical signal is output from the selector 871.

From time t11 onward, the determination results written to the memories 781, 841, and 861 and the analog-to-digital conversion result are horizontally transferred via the horizontal scanning circuit 890. At this time, in the period from time t11 to t12, the control signal MTX1 is set to a high level, and thus the switch 901 is set to on and the amplitude determination result stored in the memory 781 is output to the horizontal scanning circuit 890 via the shared signal line. Also, in the period from time t12 to t13, the control signal MTX2 is set to a high level, and thus the switch 902 is set to on and the amplitude determination result stored in a memory 782 of the column control unit 772 of a conversion unit 722 is output to the horizontal scanning circuit 890 via the shared signal line.

Next, using FIG. 12, the operation when a signal output by the pixel 10 in a case where the incident light has high luminance is analog-to-digital converted will be described. Until time t6, the operations described using FIG. 11 as the same.

In a case where the incident light has high luminance, because the decreased amount (amplitude) of the electric potential of the vertical signal line 30 at time t6 is large, the output of the comparator 760 stays a high level. Thus, the determination result written to the memory 781 in the period from time t6 to t7 is set to a high level. In this manner, the result written to the memory 781 changes depending on the result of the comparison between the signal level (amplitude) of the vertical signal line 30 and the determination threshold (reference value REF).

Thus, from time t9 onwards, the second wire 711 is connected to the non-inverting input node of the comparator 760, and the second ramp signal rampH is input.

At time t10, the analog-to-digital conversion result using the second ramp signal rampH with respect to the signal level is written to the memory 861. In the example illustrated in FIG. 12, using the determination result written to the memory 781, the analog-to-digital conversion result written to the memory 851 is selected and output from the selector 871.

From time t11 onward, the determination results written to the memories 781, 841, and 861 and the analog-to-digital conversion result are horizontally transmitted via the horizontal scanning circuit 890. At this time, in the period from time t11 to t12, the control signal MTX1 is set to a high level, and thus the switch 901 is set to on and the amplitude determination result stored in the memory 781 is output to the horizontal scanning circuit 890 via the shared signal line. Also, in the period from time t12 to t13, the control signal MTX2 is set to a high level, and thus the switch 902 is set to on and the amplitude determination result stored in a memory 782 of the column control unit 772 of a conversion unit 722 is output to the horizontal scanning circuit 890 via the shared signal line.

Note that in a case where it is determined from the amplitude determination result that the second ramp signal rampH is being used in analog-to-digital conversion, a gain in accordance with the ratio of the gradient of the first ramp signal rampL and the second ramp signal rampH is applied to the analog-to-digital conversion result. Note that the periods in which the control signals MTX1 and MTX2 are set to a high level may not be adjacent to one another.

In this manner, with a configuration using a slope analog-to-digital conversion circuit, because amplitude determination is able to be performed using a comparator included in an analog-to-digital conversion circuit, it is not necessary to also provide a determination circuit. Also, a similar effect to that of first embodiment can be achieved, that is, by a plurality of analog-to-digital conversion circuits sharing a signal line for transmitting the determination result, the number of wires can be reduced.

First Modified Example

FIGS. 13A and 13B are diagrams illustrating example circuit arrangements according to the second embodiment in a case where a plurality of vertical signal lines are provided for each pixel column. In FIGS. 13A and 13B, examples are illustrated, relating to the conversion unit 721 on the left end of FIG. 10, of a circuit arrangement able to be adopted by the conversion unit 720 in a configuration in which two vertical signal lines are provided for each pixel column. The other conversion units 722 to 72n may have a similar circuit arrangement.

FIG. 13A illustrates an example in which, in a case where a plurality of the same type of circuit are provided for the same pixel column, the circuits associated with the same vertical signal line are disposed together (close to one another). In other words, the selection unit 731A, the comparator 761A, and the column control unit 771A associated with the vertical signal line 31A are disposed together, and the selection unit 731B, the comparator 761B, and the column control unit 771B associated with the vertical signal line 31B are disposed together.

FIG. 13B illustrates an example similar to that illustrated in FIG. 9 in which the same type of circuits are disposed together. By disposing the same type of circuits together, variation in the characteristics of the circuits caused by the manufacturing process can be suppressed.

In this manner, the present embodiment is also compatible with a configuration in which a plurality of vertical signal lines are provided for each pixel column.

Second Modified Example

Even in a case where a slope analog-to-digital conversion circuit is used, amplitude determination similar to that performed in the first embodiment may be performed. For example, a configuration may be used in which the determination circuit 20 as described in the first embodiment is provided between the pixel array 5 and the conversion unit 720 and the amplitude determination result is output from the determination circuit 20 to the selection unit 731 or the horizontal scanning circuit 890. In this case, a configuration may be used in which the input of the switches 901 and 902 are determination circuits instead of the column control units 771 and 772 and the amplitude determination result is supplied from the determination circuit to the selector 870.

In FIG. 14A, an example is illustrated, relating to the pixel column on the left end of FIG. 10, of a circuit arrangement in a case where the determination circuit 20 is provided in a configuration in which two vertical signal lines are provided for each pixel column. The other pixel columns may have a similar circuit arrangement. The determination circuit 21A is provided for the vertical signal line 31A, and the determination circuit 21B is provided for the vertical signal line 31B. The configuration of the determination circuits 21A and 21B may be as described in the first embodiment.

The amplitude determination result from the determination circuit 21A is supplied to the selection unit 731A, and the amplitude determination result from the determination circuit 21B is supplied to the selection unit 731B. Also, the amplitude determination result from the determination circuit 21A is supplied to the determination circuit 21B, and the amplitude determination result from the determination circuit 21B is supplied to the horizontal scanning circuit 890. By control being performed so that either the control signal MTX1 or the MTX2 supplied to the determination circuits 21A and 21B is exclusively a high level, separate determination results can be output from the determination circuit 21A to the selection unit 731A and from the determination circuit 21B to the selection unit 731B. Also, by control being performed so that either the control signal MTX1 or the MTX2 supplied to the determination circuits 21A and 21B is exclusively a high level, the amplitude determination results of the determination circuits 21A and 21B can be separately output to the horizontal scanning circuit 890 using a single signal line. Also, according to the present modified example, the number of signal lines for transmitting the amplitude determination results can be reduced.

Third Modified Example

In the present embodiment described above, the configuration includes a dual slope analog-to-digital conversion circuit. However, by using a single slope analog-to-digital conversion circuit and changing the gain applied to the data signal, a similar effect to that obtained by the dual slope analog-to-digital conversion circuit can be obtained.

FIG. 14B is a diagram illustrating an example of a circuit configuration with the configuration illustrated in FIG. 14A in a case where instead of the ramp signal being switched, the gain is changed. Instead of the selection units 731A and 731B, amplifier circuits 1011A and 1011B with variable gain.

Using the determination result from the determination circuits 21A and 21B, the gain applied at the amplifier circuits 1101A and 1101B is controlled. By applying higher gain when the amplitude is less than the reference value REF as to when the amplitude is equal to or greater than the reference value REF, the resolution with respect to a low level data signal can be increased. The ratio of the applied gain may be the same as the ratio of the gradient of the ramp signal.

At the conversion unit 720, analog-to-digital conversion is performed using one type of ramp signal. Thus, measurement of the reset signal level only needs to be performed once. Regarding a data signal analog-to-digital converted with a high gain applied, the reciprocal of the ratio of the gain is applied to the analog-to-digital conversion result.

FIG. 14C is a diagram illustrating an example of the circuit configuration of the amplifier circuit 1011. The amplifier circuit 1011 includes a capacitive device 1020, an amplifier 1030, a variable capacitive device 1050, and a switch 1040. The vertical signal line is connected to one end of the capacitive device 1020. The other end of the capacitive device 1020 is connected to the input terminal of the amplifier 1030. The variable capacitive device 1050 and the switch 1040 are provided to connect the output terminal and input terminal of the amplifier 1030.

The switch 1040 is a reset switch and is normally off. The value of the variable capacitive device 1050 is controlled by the amplitude determination result of the determination circuit 21. The variable capacitive device 1050 has two switchable capacitance values, with a first capacitance value being set by a determination result indicating that the amplitude is less than the reference value REF and a second capacitance value being set by a determination result indicating that the amplitude is equal to or greater than the reference value REF. Here, the first capacitance value is less than the second capacitance value. Thus, in a case where the amplitude is determined to be less than the reference value REF, a higher gain can be applied to the signal data as to a case where the amplitude is determined to be equal to or greater than the reference value REF.

Note that the supplying time of the control signals MTX1 and MTX2 for transmitting the amplitude determination result via a shared signal line may be similar to that in the second modified example. Also, according to the present modified example, the number of signal lines for transmitting the amplitude determination results can be reduced.

Other Embodiments

Application examples of the photoelectric conversion device 1000 according to the embodiments described above will be described below. FIG. 15 is a schematic diagram of an electronic device EQP installed with the photoelectric conversion device 1000. In the example illustrated in FIG. 15, the electronic device EQP is a camera. Here, the concept "camera" includes in its meaning not only an apparatus with the main purpose of capturing images, but also apparatuses (for example, a personal computer, a smart phone, and other portable terminals) that can be provided with an image capture function via an auxiliary.

The photoelectric conversion device 1000 may be a semiconductor chip with a multilayer structure provided with the pixel array 5. As illustrated in FIG. 15, the photoelectric conversion device 1000 is housed in a semiconductor package PKG. The package PKG may include a base where the photoelectric conversion device 1000 is fixed, a cover body disposed opposite the photoelectric conversion device 1000, and an electrical conductive connection member that connects the terminal provided on the base and the terminal provided on the photoelectric conversion device 1000. The cover body may be made of glass, for example. Also, the connection member may be a bonding wire, bump, or the like. The device EQP may further include any one of an optical system OPT, a control apparatus CTRL, a processing apparatus PRCS, a display apparatus DSPL, or a storage apparatus MMRY.

The optical system OPT is a lens, shutter, mirror, or the like that forms an image in the photoelectric conversion device 1000. The control apparatus CTRL is a semiconductor device such as an ASIC or a similar apparatus that controls the operations of the photoelectric conversion device 1000. The processing apparatus PRCS is a semiconductor device, such as a CPU, ASIC, or the like, or a similar apparatus that processes the signal output from the photoelectric conversion device 1000. The display apparatus DSPL is an EL display apparatus, a liquid crystal display device, or the like that displays the image data obtained by the photoelectric conversion device 1000. The storage apparatus MMRY is a magnetic device, semiconductor device, or the like that stores the image data obtained by the photoelectric conversion device 1000. The storage apparatus MMRY may be volatile memory, such as SRAM, DRAM, or the like, or may be non-volatile memory, such as a flash memory, a hard disk drive, or the like. A machine apparatus MCHN includes a moving unit or a propulsion unit such as a motor, engine, or the like. The machine apparatus MCHN of the camera is capable of driving the components of the optical system OPT for zooming, focusing, and shutter operations. In the device EQP, the image data output from the photoelectric conversion device 1000 is displayed on the display apparatus DSPL, transmitted to outside via a communication apparatus (not illustrated) provided in the device EQP, or the like. Thus, the device EQP may be provided with the storage apparatus MMRY and/or the processing apparatus PRCS.

The camera installed with the photoelectric conversion device 1000 may be used as a surveillance camera, an in-vehicle camera installed on a transport device, such as an automobile, a railway vehicle, a watercraft, an aircraft, or an industrial robot, or the like. In addition, the camera installed with the photoelectric conversion device 1000 is not limited to being used in a transport device and may be used in a wide-range of device that use object recognition such as an intelligent transportation system (ITS).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-045160, filed on Mar. 18, 2021, which is hereby incorporated by reference herein in its entirety.

What is claimed is:

1. A photoelectric conversion device, comprising:
a pixel array including pixels each generates a signal via photoelectric conversion arranged in rows and columns;
a plurality of determination circuits, each of which performs determination of an amplitude of one of the signals read out from the pixel array via different vertical signal lines; and
a shared signal line shared by the plurality of determination circuits that transmits results of the determination from the plurality of determination circuits to a circuit inside the photoelectric conversion device,
wherein the results of the determination are binary signals.

2. The photoelectric conversion device according to claim 1, wherein
after a result of the determination is output from one determination circuit of the plurality of determination circuits to the shared signal line, a result of the determination is output from another determination circuit of the plurality of determination circuits to the shared signal line.

3. The photoelectric conversion device according to claim 1, wherein
the plurality of determination circuits are respectively connected to the vertical signal lines provided for different pixel columns.

4. The photoelectric conversion device according to claim 1, wherein
the plurality of determination circuits are respectively connected to the different vertical signal lines provided for a same pixel column.

5. The photoelectric conversion device according to claim 1, further comprising:
holding circuits respectively connected to the vertical signal lines and hold the signals; and
analog-to-digital conversion circuits that perform analog-to-digital conversion of signals held in the holding circuits, wherein
each of the analog-to-digital conversion circuits is provided for two or more of the holding circuits.

6. The photoelectric conversion device according to claim 5, further comprising:
a selection circuit that selectively outputs signals held by two or more of the holding circuits to a corresponding analog-to-digital conversion circuit.

7. The photoelectric conversion device according to claim 6, further comprising:
a switching circuit that selectively connects the plurality of determination circuits to the shared signal line, wherein
the switching circuit is provided at a position closer to the pixel array than the selection circuit.

8. The photoelectric conversion device according to claim 7, wherein
the switching circuit has a smaller circuit size than the selection circuit.

9. The photoelectric conversion device according to claim 6, wherein
the plurality of determination circuits are connected to the shared signal line at a position closer to the pixel array than the selection circuit.

10. The photoelectric conversion device according to claim 1, wherein
the plurality of determination circuits are controlled to output a result of the determination in different periods.

11. The photoelectric conversion device according to claim 1, further comprising:
a plurality of analog-to-digital conversion circuits connected to the vertical signal lines that perform analog-to-digital conversion of the signals read out from the vertical signal lines, wherein
the plurality of analog-to-digital conversion circuits are a slope type; and
the plurality of determination circuits are comparators included in the plurality of analog-to-digital conversion circuits.

12. The photoelectric conversion device according to claim 11, wherein
each one of the plurality of analog-to-digital conversion circuits controls a gradient of a ramp signal used in the analog-to-digital conversion on the basis of a result of the determination.

13. The photoelectric conversion device according to claim 1, further comprising:
a plurality of amplifier circuits that control gain applied to the signal on the basis of a result of the determination by the plurality of determination circuits; and
a plurality of analog-to-digital conversion circuits respectively connected to the vertical signal lines that perform analog-to-digital conversion of the signals read out from the vertical signal lines, wherein
each one of the analog-to-digital conversion circuits performs analog-to-digital conversion of the signal to which a gain has been applied by one of the plurality of amplifier circuits.

14. The photoelectric conversion device according to claim 1, wherein in a case where a plurality of the vertical signal lines are provided for a same pixel column, circuits provided for each one of the plurality of the vertical signal lines are disposed so that circuits of the same type are to be close.

15. The photoelectric conversion device according to claim 1, wherein each one of the plurality of determination circuits is an auto-zero differential amplifier with a function that takes the signal and a reference value used in the determination as input and cancels input offset.

16. The photoelectric conversion device according to claim 1, wherein each one of the plurality of determination circuits is driven by a current source connected to the vertical signal line of the pixel.

17. An electronic device, comprising:

a photoelectric conversion device; and a control apparatus that controls operations of the photoelectric conversion device, wherein the photoelectric conversion device comprising:

a pixel array including pixels each generates a signal via photoelectric conversion arranged in rows and columns;

a plurality of determination circuits, each of which performs determination of an amplitude of one of the signals read out from the pixel array via different vertical signal lines; and a shared signal line shared by the plurality of determination circuits that transmits results of the determination from the plurality of determination circuits to a circuit inside the photoelectric conversion device, wherein the results of the determination are binary signals.

18. A substrate stacked on a substrate provided with a pixel array including pixels each generates a signal via photoelectric conversion arranged in rows and columns, comprising:

a plurality of determination circuits, each of which performs determination of an amplitude of one of signals read out from the pixel array via different vertical signal lines; and a shared signal line shared by the plurality of determination circuits that transmits results of the determination from the plurality of determination circuits to a circuit other than the plurality of determination circuits provided on the substrate, wherein the results of the determination are binary signals.

* * * * *